United States Patent
Zhu et al.

(10) Patent No.: US 11,989,383 B2
(45) Date of Patent: *May 21, 2024

(54) APPLICATION WINDOW DISPLAY METHOD AND TERMINAL

(71) Applicant: Huawei Technologies Co., Ltd., Shenzhen (CN)

(72) Inventors: Dengkui Zhu, Shenzhen (CN); Hao Huang, Shenzhen (CN); Zhichao Yang, Shenzhen (CN); Bin Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/700,979

(22) Filed: Mar. 22, 2022

(65) Prior Publication Data
US 2022/0283676 A1 Sep. 8, 2022

Related U.S. Application Data

(63) Continuation of application No. 17/040,160, filed as application No. PCT/CN2018/080312 on Mar. 23, 2018, now Pat. No. 11,287,944.

(51) Int. Cl.
*G06F 3/0481* (2022.01)
*G06F 3/04845* (2022.01)
*G06F 3/04886* (2022.01)

(52) U.S. Cl.
CPC ........ *G06F 3/0481* (2013.01); *G06F 3/04845* (2013.01); *G06F 3/04886* (2013.01); *G06F 2203/04803* (2013.01)

(58) Field of Classification Search
CPC .... G06F 30/00; G06F 2113/12; G06F 3/0482; G06F 40/186; G06F 3/04845; G06F 2119/18; G06F 3/04817; G06F 3/04842; G06F 3/04847; G06F 3/04886; G06F 2111/16; G06F 15/16; G06F 21/10;
(Continued)

(56) References Cited

U.S. PATENT DOCUMENTS 9,471,214 B2   10/2016   Hunt et al.
9,779,475 B2   10/2017   Park
(Continued)

FOREIGN PATENT DOCUMENTS

CN    1558309 A    12/2004
CN    102073491 A    5/2011
(Continued)

*Primary Examiner* — Rayeez R Chowdhury
(74) *Attorney, Agent, or Firm* — Slater Matsil, LLP

(57) ABSTRACT

An application window display method and a terminal. The method includes displaying, by a terminal, a first GUI, where the first GUI includes a first application window, receiving, by the terminal, an input operation performed on the first application window, and displaying, by the terminal, a second GUI in response to the input operation, where the second GUI includes a soft keyboard at a fixed display location, and an area in the second GUI other than the soft keyboard includes the completely displayed first application window, and the display location of the soft keyboard in the second GUI partially or completely overlaps a display location of the first application window in the first GUI.

21 Claims, 19 Drawing Sheets

(58) Field of Classification Search
CPC ......... G06F 21/6218; G06F 2221/2113; G06F 3/0485; G06F 3/04883; G06F 3/041; G06F 3/0237; G06F 3/0488; G06F 1/1626; G06F 2203/04803; G06F 3/0233; G06F 3/043; G06F 3/0219; G06F 3/0436; G06F 2203/04105; G06F 2203/04106; G06F 3/017; G06F 3/0418; G06F 3/0433; G06F 3/165; G06F 2203/04808; G06F 3/0202; G06F 3/0236; G06F 3/0489; G06F 40/274

See application file for complete search history.

(56) References Cited

U.S. PATENT DOCUMENTS

| | | | |
|---|---|---|---|
| 2003/0210272 A1 | 11/2003 | D'Souza | |
| 2010/0164959 A1* | 7/2010 | Brown | G06F 3/04886 345/173 |
| 2010/0323762 A1 | 12/2010 | Sindhu | |
| 2011/0043702 A1 | 2/2011 | Hawkins | |
| 2012/0084698 A1 | 4/2012 | Sirpal et al. | |
| 2012/0113007 A1* | 5/2012 | Koch | G06F 3/017 345/168 |
| 2013/0067278 A1 | 3/2013 | Zhou et al. | |
| 2014/0189566 A1* | 7/2014 | Kim | G06F 3/013 715/773 |
| 2014/0325434 A1* | 10/2014 | Chang | G06F 3/04886 715/790 |
| 2015/0012881 A1 | 1/2015 | Song et al. | |
| 2015/0095833 A1* | 4/2015 | Kim | G06F 3/04812 715/773 |
| 2015/0331605 A1 | 11/2015 | Park et al. | |
| 2016/0048326 A1 | 2/2016 | Kim et al. | |
| 2017/0192673 A1* | 7/2017 | Kitada | G06F 3/04886 |
| 2017/0357324 A1* | 12/2017 | Chaudhri | G06F 3/04847 |
| 2020/0409512 A1* | 12/2020 | Jing | G06F 3/0481 |
| 2021/0019022 A1 | 1/2021 | Yi | |

FOREIGN PATENT DOCUMENTS

| | | |
|---|---|---|
| CN | 103309616 A | 9/2013 |
| CN | 103677630 A | 3/2014 |
| CN | 105359086 A | 2/2016 |
| CN | 106020697 A | 10/2016 |
| CN | 106227458 A | 12/2016 |
| CN | 106951175 A | 7/2017 |
| CN | 104904126 B | 10/2017 |
| CN | 107251536 A | 10/2017 |
| CN | 107479897 A | 12/2017 |
| EP | 0422577 A2 | 10/1990 |

* cited by examiner

APPLICATION WINDOW DISPLAY METHOD AND TERMINAL

CROSS REFERENCE TO RELATED APPLICATIONS

This application is a continuation of U.S. patent application Ser. No. 17/040,160, filed on Sep. 22, 2020, now U.S. Pat. No. 11,287,944 issuing Mar. 29, 2022, which is a national stage of International Application No. PCT/CN2018/080312, filed on Mar. 23, 2018. Both of the aforementioned patent applications are hereby incorporated by reference in their entireties.

TECHNICAL FIELD

Embodiments of this application relate to the field of display technologies, and in particular, to an application window display method and a terminal.

BACKGROUND

Currently, more terminals (for example, a mobile phone or a tablet computer) can support a split-screen display function for displaying a plurality of application windows. The tablet computer is used as an example. As shown in FIG. 1, the tablet computer may simultaneously run and display an application window 1 of an application A and an application window 2 of an application B. In this way, a user may simultaneously open and view screens of a plurality of applications.

In a scenario in which the terminal is not connected to a physical keyboard, if the user expects to enter a character string in an input box 11 in the application window 1 (or the application window 2), still as shown in FIG. 1, the user may tap the input box 11, so that the terminal invokes an input method service to display a soft keyboard 12. The soft keyboard 12 usually fixedly pops up from the bottom of a currently displayed screen, and fixedly occupies a part of display space of the currently displayed screen.

In this case, when the application window 1 and the display space occupied by the soft keyboard 12 overlap, the soft keyboard 12 blocks some display content in the application window 1. As shown in FIG. 1, the soft keyboard 12 may even block the input box 11 in the application window 1. Consequently, the user cannot view the input content, and can only perform "touch typing". This severely reduces input efficiency of the terminal.

SUMMARY

Embodiments of this application provide an application window display method and a terminal, to prevent an input method soft keyboard from blocking a to-be-input application window, and improve input efficiency of a terminal.

To achieve the foregoing objective, the following technical solutions are used in the embodiments of this application.

According to a first aspect, an embodiment of this application provides an application window display method. The method may be applied to a terminal that supports displaying a plurality of application windows, and the method specifically includes displaying, by the terminal, a first graphical user interface (GUI) including a first application window, receiving, by the terminal, an input operation performed on the first application window, and displaying, by the terminal, a second GUI in response to the input operation, where the second GUI includes a soft keyboard at a fixed display location, and an area in the second GUI other than the soft keyboard includes the completely displayed first application window, and the display location of the soft keyboard in the second GUI partially or completely overlaps a display location of the first application window in the first GUI.

In other words, when both the first application window and the soft keyboard providing an input method service for the first application window are displayed, there is no overlapping or blocking between the first application window and the soft keyboard. To be specific, when the terminal that supports a multi-application window function provides the input method service for each application window, the soft keyboard does not block the application window, and therefore input efficiency and input experience of a user are not affected.

In a possible design method, the displaying, by the terminal, a second GUI specifically includes drawing, by the terminal, the soft keyboard at a fixed location in the second GUI, determining, by the terminal, the area in the second GUI other than the soft keyboard as a drawing area in which an application window is allowed to be drawn, and drawing, by the terminal, the first application window in the drawing area. Because the drawing area does not overlap an area in which the soft keyboard is displayed, the first application window drawn by the terminal in the drawing area does not overlap the soft keyboard, to avoid blocking the first application window when the terminal displays the soft keyboard.

In a possible design method, the drawing, by the terminal, the first application window in the drawing area specifically includes querying, by the terminal, a window state of the first application window in the first GUI, determining, by the terminal, window parameters of the first application window in the second GUI based on the window state, where the window parameters include a size and a location that are of the first application window, and drawing, by the terminal, the first application window in the drawing area by using the window parameters.

When the window state of the first application window in the first GUI is a maximized state, the determining, by the terminal, window parameters of the first application window in the second GUI based on the window state specifically includes determining, by the terminal, a location and a size that are of a largest rectangle in the drawing area as the window parameters of the first application window in the second GUI.

When the window state of the first application window in the first GUI is a restored state, the determining, by the terminal, window parameters of the first application window in the second GUI based on the window state specifically includes determining, by the terminal, whether the first application window in the first GUI is able to be disposed in the drawing area, and if the first application window is able to be disposed in the drawing area, using, by the terminal, a first size of the first application window in the first GUI as the size of the first application window in the second GUI, and using, by the terminal, a location with the first size in the drawing area as the location of the first application window in the second GUI, or if the first application window is not able to be disposed in the drawing area, reducing, by the terminal, the first application window from a first size to a second size, and using, by the terminal, a location with the second size in the drawing area as the location of the first application window in the second GUI.

For example, the soft keyboard is fixedly displayed at the bottom of the second GUI, and a height D2 of the first application window in the first GUI is less than or equal to a height D1 of the drawing area. Therefore, the using, by the terminal, a location with the first size in the drawing area as the location of the first application window in the second GUI specifically includes determining, by the terminal, a location obtained after the first application window in the first GUI is translated by a first distance (the first distance is a distance at which the first application window in the first GUI overlaps the soft keyboard in a first direction) along the first direction (the first direction is a direction in which the first application window is away from the soft keyboard) as the location of the first application window in the second GUI.

For example, the soft keyboard is fixedly displayed at the bottom of the second GUI, and a height D2 of the first application window in the first GUI is greater than a height D1 of the drawing area. Therefore, the reducing, by the terminal, the first application window from a first size to a second size specifically includes using, by the terminal, the height D1 of the drawing area as a height of the first application window in the second GUI, and using a width of the first application window in the first GUI as a width of the first application window in the second GUI, to obtain the size of the first application window in the second GUI.

In addition, the using, by the terminal, a location with the second size in the drawing area as the location of the first application window in the second GUI specifically includes determining, by the terminal, a location obtained after the first application window in the first GUI is translated by a second distance along a first direction as the location of the first application window in the second GUI, where the first direction is a direction in which the first application window is away from the soft keyboard, and the second distance is a distance between the first application window in the first GUI and the top of the first GUI.

In a possible design method, the first GUI further includes a second application window. The second GUI further includes the second application window that does not overlap the soft keyboard, and the display location of the soft keyboard in the second GUI partially or completely overlaps a display location of the second application window in the first GUI. In other words, in an application scenario in which the soft keyboard runs, when drawing any application window, the terminal may draw the application window in a drawing area that does not overlap the soft keyboard. In this way, the first application window for which the soft keyboard provides the input method service is not blocked by the soft keyboard during display, and another application window (for example, the second application window) on a terminal screen is not blocked by the soft keyboard during display.

In a possible design method, the first application window displayed in the second GUI does not overlap the second application window, to avoid blocking between the plurality of application windows when the plurality of application windows are displayed.

According to a second aspect, an embodiment of this application provides a terminal that can support to display a plurality of application windows. The terminal includes a display unit, configured to display a first GUI, where the first GUI includes a first application window, and an input unit is configured to receive an input operation performed on the first application window, where the display unit is further configured to display a second GUI, where the second GUI includes a soft keyboard at a fixed display location, and an area in the second GUI other than the soft keyboard includes the completely displayed first application window, and the display location of the soft keyboard in the second GUI partially or completely overlaps a display location of the first application window in the first GUI.

In a possible design method, the terminal further includes a drawing unit, configured to draw the soft keyboard at a fixed location in the second GUI, and a determining unit, configured to determine the area in the second GUI other than the soft keyboard as a drawing area in which an application window is allowed to be drawn, where the drawing unit is further configured to draw the first application window in the drawing area.

In a possible design method, the drawing unit is specifically configured to query a window state of the first application window in the first GUI, determine window parameters of the first application window in the second GUI based on the window state, where the window parameters include a size and a location that are of the first application window, and draw the first application window in the drawing area by using the window parameters.

In a possible design method, the window state of the first application window in the first GUI is a maximized state. The determining unit is further configured to determine a location and a size that are of a largest rectangle in the drawing area as the window parameters of the first application window in the second GUI.

In a possible design method, the window state of the first application window in the first GUI is a restored state. The determining unit is further configured to determine whether the first application window in the first GUI is able to be disposed in the drawing area, and if the first application window is able to be disposed in the drawing area, use a first size of the first application window in the first GUI as the size of the first application window in the second GUI, and use, by the terminal, a location with the first size in the drawing area as the location of the first application window in the second GUI, or if the first application window is not able to be disposed in the drawing area, reduce the first application window from a first size to a second size, and use, by the terminal, a location with the second size in the drawing area as the location of the first application window in the second GUI.

In a possible design method, the soft keyboard is fixedly displayed at the bottom of the second GUI, and a height D2 of the first application window in the first GUI is less than or equal to a height D1 of the drawing area. The determining unit is specifically configured to determine a location obtained after the first application window in the first GUI is translated by a first distance along a first direction as the location of the first application window in the second GUI, where the first direction is a direction in which the first application window is away from the soft keyboard, and the first distance is a distance at which the first application window in the first GUI overlaps the soft keyboard in the first direction.

In a possible design method, the soft keyboard is fixedly displayed at the bottom of the second GUI, and a height D2 of the first application window in the first GUI is greater than a height D1 of the drawing area. The determining unit is specifically configured to use the height D1 of the drawing area as a height of the first application window in the second GUI, and use a width of the first application window in the first GUI as a width of the first application window in the second GUI, to obtain the size of the first application window in the second GUI, and determine a location obtained after the first application window in the first GUI is translated by a second distance along a first direction as the location of the first application window in the second GUI, where the first direction is a direction in which the first application window is away from the soft keyboard, and the second distance is a distance between the first application window in the first GUI and the top of the first GUI.

According to a third aspect, an embodiment of this application provides a terminal, including a processor, a memory, a display, and a communications interface. The memory is configured to store a computer execution instruction, the processor is coupled to the memory, and when the terminal runs, the processor executes the computer execution instruction stored in the memory, so that the terminal performs any one of the foregoing application window display methods.

According to a fourth aspect, an embodiment of this application provides a computer readable storage medium. The computer readable storage medium stores an instruction, and when the instruction is run on any one of the foregoing terminals, the terminal is enabled to perform any one of the foregoing application window display methods.

According to a fifth aspect, an embodiment of this application provides a computer program product including an instruction. When the computer program product is run on any one of the foregoing terminals, the terminal is enabled to perform any one of the foregoing application window display methods.

In the embodiments of this application, names of components in the terminal do not constitute a limitation on the device. In an actual implementation, these components may have other names. Provided that functions of the components are similar to those in the embodiments of this application, the components fall within the scope of the claims of this application and equivalent technologies thereof.

In addition, for technical effects brought by any design method in the second aspect to the fifth aspect, refer to technical effects brought by different design methods in the first aspect. Details are not described herein again.

DETAILED DESCRIPTION OF ILLUSTRATIVE EMBODIMENTS

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the description of the embodiment of this application, unless otherwise stated, "a plurality of" means two or more than two.

An application window display method provided in the embodiments of this application may be applied to any terminal that supports displaying a plurality of application windows, such as a mobile phone, a tablet computer, a wearable device, a vehicle-mounted device, an augmented reality (AR)/virtual reality (VR) device, a notebook computer, a vehicle-mounted device, an unmanned aerial vehicle, an ultra-mobile personal computer (UMPC), a netbook, or a personal digital assistant (PDA). This is not limited in the embodiments of this application.

Figure 1:
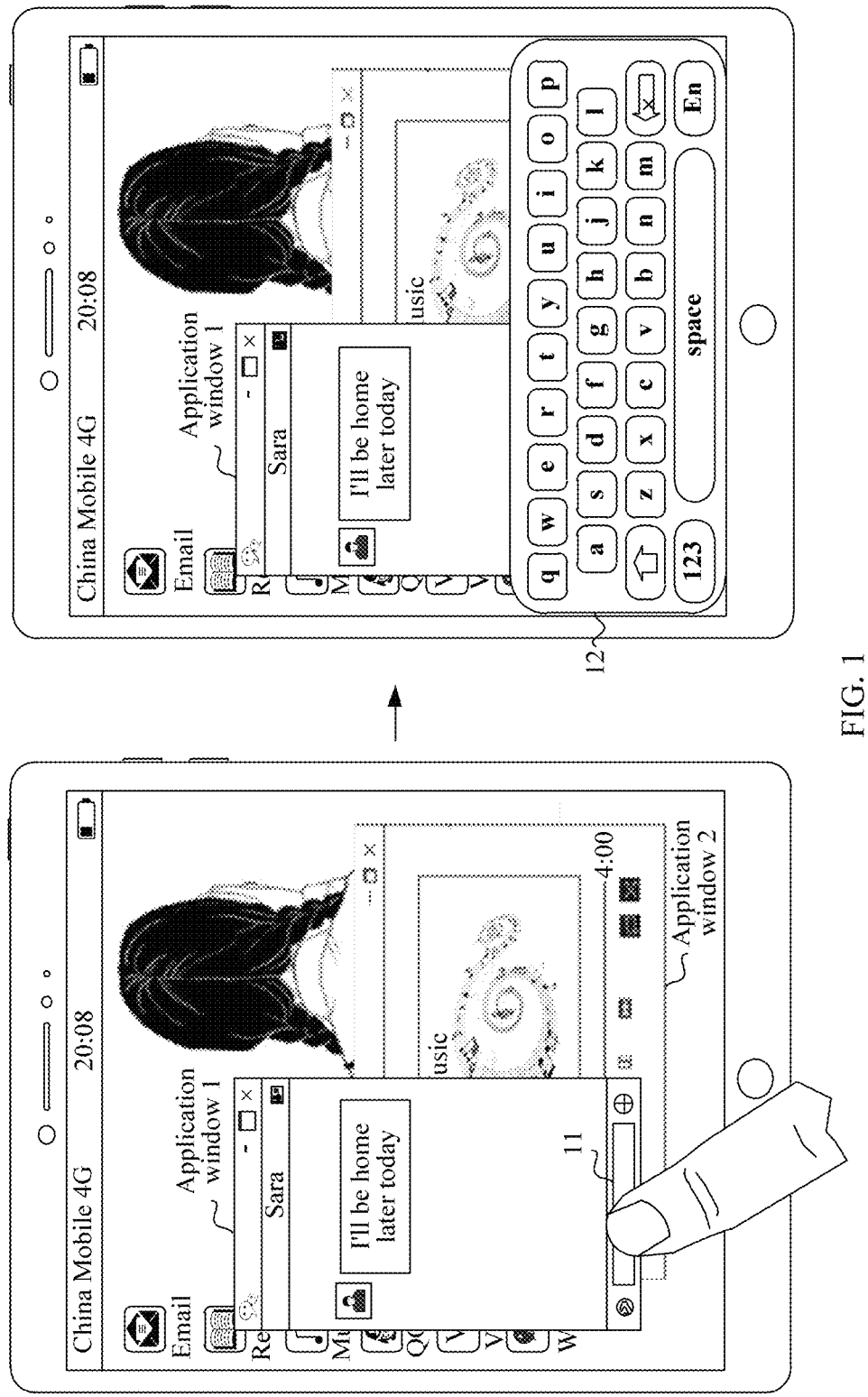
FIG. 1 is a schematic diagram 1 of a display scenario of a plurality of application windows in the prior art.
Figure 2:
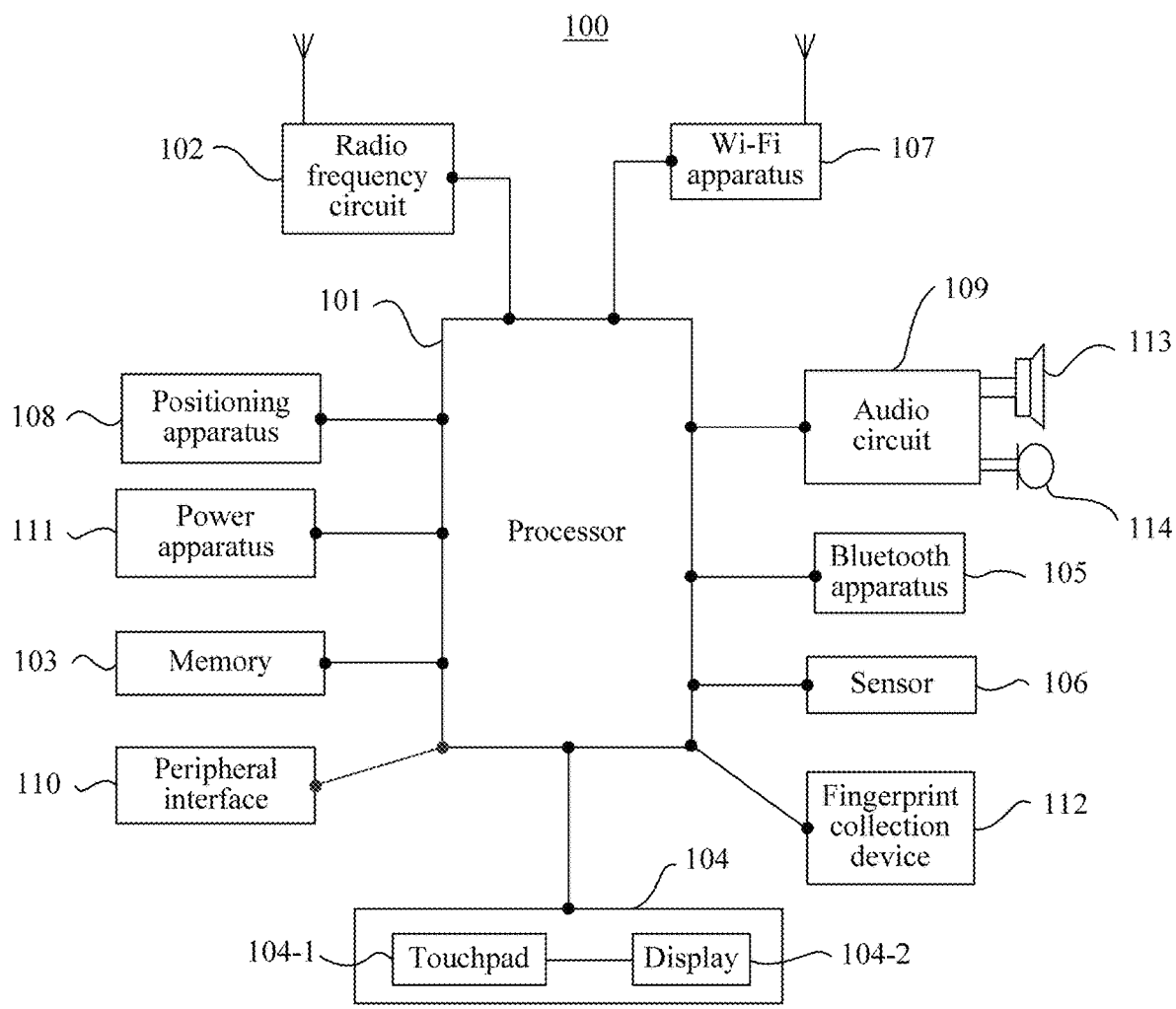
FIG. 2 is a schematic structural diagram 1 of a terminal according to an embodiment of this application.

As shown in FIG. 2, a terminal in an embodiment of this application may be a tablet computer 100. The following uses the tablet computer 100 as an example to specifically describe this embodiment. It should be understood that the tablet computer 100 shown in the figure is merely an example of the terminal, and the tablet computer 100 may have more or fewer components than those shown in the figure, or may combine two or more components, or may have different component configurations.

As shown in FIG. 2, the tablet computer 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power system 111. These components may perform communication by using one or more communications buses or signal cables (not shown in FIG. 2). A person skilled in the art may understand that a hardware structure shown in FIG. 2 does not constitute a limitation on the tablet computer, and the tablet computer 100 may include more or fewer components than those shown in the figure, or may combine some components, or may have different component arrangements.

The following specifically describes the components of the tablet computer 100 with reference to FIG. 2.

The processor 101 is a control center of the tablet computer 100. The processor 101 is connected to the parts of the tablet computer 100 by using various interfaces and lines, and performs various functions of the tablet computer 100 and data processing by running or executing an application program stored in the memory 103 and invoking data stored in the memory 103. In some embodiments, the processor 101 may include one or more processing units. For example, the processor 101 may be a chip Kirin 960 manufactured by Huawei Technologies Co., Ltd. In some embodiments of this application, the processor 101 may further include a fingerprint verification chip, configured to verify a collected fingerprint.

The radio frequency circuit 102 may be configured to receive and send radio signals in an information receiving and sending process or a call process. Particularly, after receiving downlink data from a base station, the radio frequency circuit 102 may send the downlink data to the processor 101 for processing, and sends related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to a global system for mobile communications, a general packet radio service, code division multiple access, wideband code division multiple access, long term evolution, an email, a short message service, and the like.

The memory 103 is configured to store the application program and the data. The processor 101 performs the various functions of the tablet computer 100 and data processing by running the application program and the data that are stored in the memory 103. The memory 103 mainly includes a program storage area and a data storage area. The program storage area may store an operating system and an application program required by at least one function (such as a sound playback function or an image playback function). The data storage area may store data (such as audio data or a phone book) that is created based on use of the tablet computer 100. In addition, the memory 103 may include a high-speed random access memory (RAM), or may include a nonvolatile memory such as a magnetic disk storage device, a flash memory device, or another volatile solid-state storage device. The memory 103 may store various operating systems such as an iOS® operating system developed by Apple and an Android® operating system developed by Google. The memory 103 may be standalone, and is connected to the processor 101 by using the communications bus, or the memory 103 may be integrated into the processor 101.

The touchscreen 104 may specifically include a touchpad 104-1 and a display 104-2.

The touchpad 104-1 may collect a touch operation (for example, an operation performed by a user of the tablet computer 100 on the touchpad 104-1 or near the touchpad 104-1 by using any proper object such as a finger or a stylus) performed by the user on or near the touchpad 104-1, and send collected touch information to another device (for example, the processor 101). The touch operation performed by the user near the touchpad 104-1 may be referred to as a floating touch. The floating touch may mean that the user does not need to directly touch the touchpad for selecting, moving, or dragging an object (for example, an icon), and the user only needs to be near the terminal to perform a desired function. In addition, the touchpad 104-1 may be implemented in a plurality of types such as a resistive type, a capacitive type, an infrared type, and a surface acoustic wave type.

The display (also referred to as a display) 104-2 may be configured to display information entered by the user or information provided for the user, and various menus of the tablet computer 100. The display 104-2 may be configured in a form such as a liquid crystal display or an organic light emitting diode. The touchpad 104-1 may cover the display 104-2. When detecting the touch operation on or near the touchpad 104-1, the touchpad 104-1 transfers the touch operation to the processor 101 to determine a type of the touch operation. Then, the processor 101 may provide corresponding visual output on the display 104-2 based on the type of the touch operation. In FIG. 2, the touchpad 104-1 and the display 104-2 serve as two independent components to implement input and output functions of the tablet computer 100. However, in some embodiments, the touchpad 104-1 and the display 104-2 may be integrated to implement the input and output functions of the tablet computer 100.

It may be understood that the touchscreen 104 is formed by stacking a plurality of layers of materials. In this embodiment of this application, only the touchpad (layer) and the display (layer) are displayed, and another layer is not recorded in this embodiment of this application. In addition, the touchpad 104-1 may be configured on a front side of the tablet computer 100 in a full panel form, and the display 104-2 may also be configured on the front side of the tablet computer 100 in a full panel form. In this way, a bezel-less structure can be implemented on the front side of the tablet computer.

The tablet computer 100 may further include the Bluetooth apparatus 105, configured to implement data exchange between the tablet computer 100 and another short-distance terminal (for example, a tablet computer or a smartwatch). In this embodiment of this application, the Bluetooth apparatus may be a device such as an integrated circuit or a Bluetooth chip.

The tablet computer 100 may further include the at least one sensor 106 such as a fingerprint collection device 112, a light sensor, a motion sensor, and another sensor. Specifically, the fingerprint collection device 112 may be configured on a back side (for example, below a rear-facing camera) of the tablet computer 100, or the fingerprint collection device 112 may be configured on the front side (for example, below the touchscreen 104) of the tablet computer 100. For another example, the fingerprint collection device 112 may be configured on the touchscreen 104 to implement a fingerprint recognition function. In other words, the fingerprint collection device 112 may be integrated into the touchscreen 104 to implement the fingerprint recognition function of the tablet computer 100. The light sensor may include an ambient light sensor and a proximity sensor. The ambient light sensor may adjust luminance of the display on the touchscreen 104 based on intensity of ambient light, and the proximity sensor may power off the display when the tablet computer wo moves to an ear. As a type of motion sensor, an accelerometer sensor may detect magnitudes of acceleration in all directions (usually three axes), may detect a magnitude and a direction of gravity in a static state, and may be used in an application for recognizing a tablet computer posture (such as switching between a landscape mode and a portrait mode, a related game, or magnetometer posture calibration), a function related to vibration recognition (such as a pedometer or a knock), or the like. For another sensor that may be configured on the tablet computer wo, such as a gyroscope, a barometer, a hygrometer, a thermometer, or an infrared sensor, details are not described herein.

The Wi-Fi apparatus 107 is configured to provide the tablet computer wo with network access that complies with a Wi-Fi-related standard or protocol. The tablet computer wo may access a Wi-Fi access point by using the Wi-Fi apparatus 107, to help the user receive and send emails, browse a web page, access streaming media, and the like. The Wi-Fi apparatus 107 provides a wireless broadband internet access for the user. In some other embodiments, the Wi-Fi apparatus 107 may alternatively be used as a Wi-Fi wireless access point, and may provide Wi-Fi network access for another terminal.

The positioning apparatus 108 is configured to provide a geographical location for the tablet computer wo. It can be understood that the positioning apparatus 108 may be specifically a receiver of a positioning system such as a global positioning system (global positioning system, GPS), a BeiDou navigation satellite system, or a Russian GLONASS. After receiving the geographical location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (AGPS). The AGPS system serves as an assisted server to assist the positioning apparatus 108 in completing ranging and positioning services. In this case, the assisted positioning server communicates with the positioning apparatus 108 (namely, a GPS receiver) of the terminal such as the tablet computer 100 through a wireless communications network to provide positioning assistance. In some other embodiments, the positioning apparatus 108 may alternatively be a positioning technology based on a Wi-Fi access point. Each Wi-Fi access point has a globally unique media access control (MAC) address, and the terminal can scan and collect a broadcast signal of a surrounding Wi-Fi access point when Wi-Fi is enabled. Therefore, a MAC address that is broadcast by the Wi-Fi access point can be obtained. The terminal sends such data (for example, the MAC address) that can identify the Wi-Fi access point to a location server through the wireless communications network. The location server retrieves a geographical location of each Wi-Fi access point, obtains a geographical location of the terminal through calculation with reference to strength of the Wi-Fi broadcast signal, and sends the geographical location of the terminal to the positioning apparatus 108 of the terminal.

The audio circuit 109, a speaker 113, and a microphone 114 may provide an audio interface between the user and the tablet computer 100. The audio circuit 109 may convert received audio data into an electrical signal and then transmit the electrical signal to the speaker 113, and the speaker 113 converts the electrical signal into a sound signal for output. In addition, the microphone 114 converts a collected sound signal into an electrical signal, and the audio circuit 109 receives the electrical signal, converts the electrical signal into audio data, and then outputs the audio data to the RF circuit 102, to send the audio data to, for example, another tablet computer, or outputs the audio data to the memory 103 for further processing.

The peripheral interface 110 is configured to provide various interfaces for an external input/output device (for example, a keyboard, a mouse, an external display, an external memory, or a subscriber identification module card). For example, the peripheral interface 110 is connected to the mouse by using a universal serial bus (USB) interface, and is connected, by using a metal contact on a card slot of the subscriber identification module card, to the subscriber identification module (SIM) card provided by a telecommunications operator. The peripheral interface 110 may be configured to couple the external input/output peripheral device to the processor 101 and the memory 103.

The tablet computer 100 may further include the power apparatus 111 (such as a battery and a power management chip) that supplies power to the components. The battery may be logically connected to the processor 101 by using the power management chip, so that the power apparatus 111 implements functions such as charging and discharging management and power consumption management.

Although not shown in FIG. 2, the tablet computer 100 may further include a camera (a front-facing camera and/or a rear-facing camera), a camera flash, a micro-projection apparatus, a near field communication (NFC) apparatus, and the like. Details are not described herein.

Figure 3:
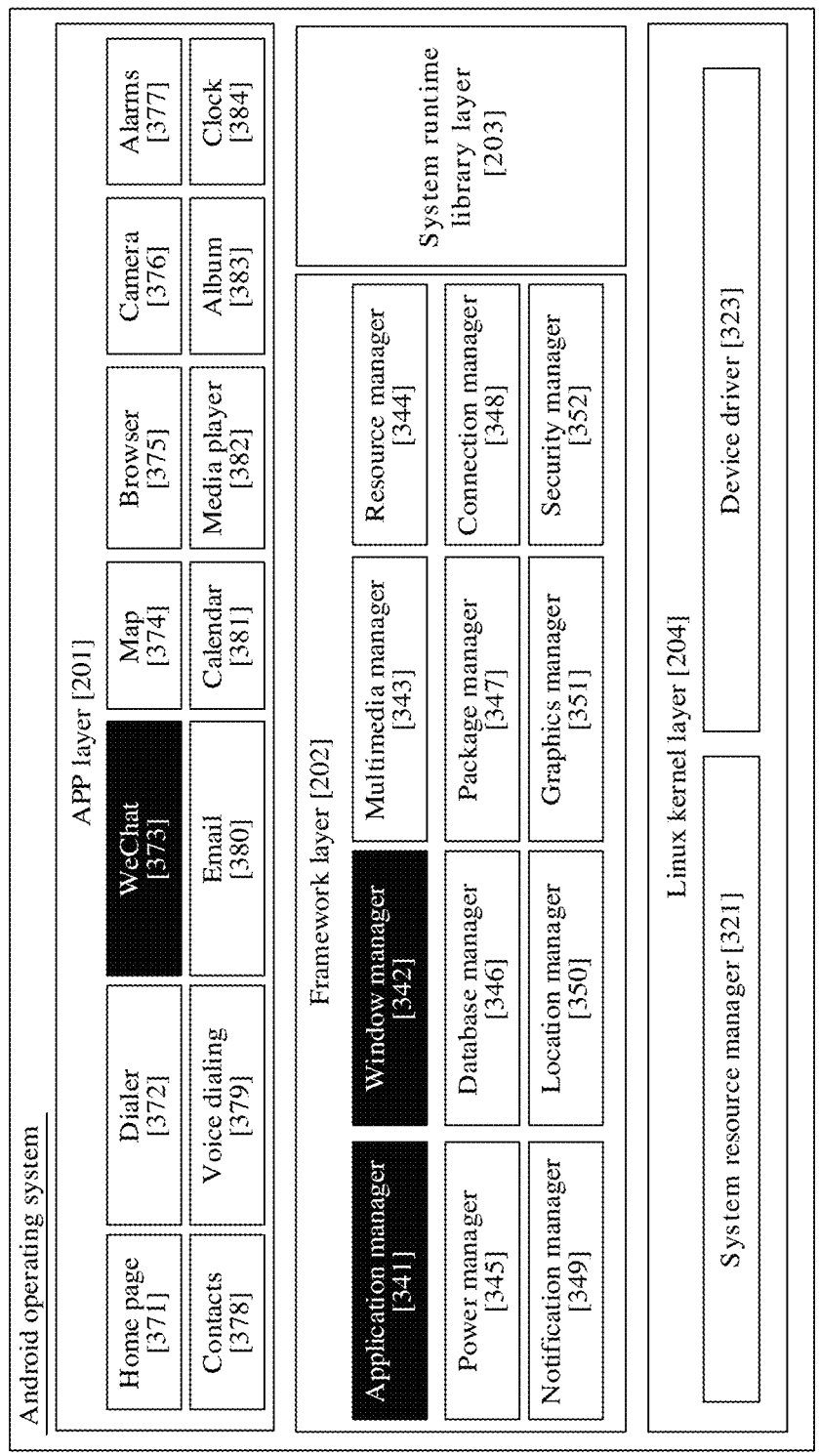
FIG. 3 is a schematic architectural diagram of an Android operating system according to an embodiment of this application.

For example, an operating system of the tablet computer 100 may be an operating system such as Android or iOS. The Android operating system is used as an example. As shown in FIG. 3, the Android operating system may be divided into four layers: an application program layer 201 (namely, an app layer), an application program framework layer 202 (namely, a framework layer), a system runtime library layer 203 (namely, a libraries layer or a native layer), and a Linux kernel layer 204 in descending order.

The Linux kernel layer 204 may be configured to control functions such as security, memory management, program management, a network stack, and a driver model of the tablet computer 100. The Linux kernel layer 204 is also used as an abstraction layer between hardware (for example, a central processing unit (CPU), a network adapter, and a memory) and a software stack. The Linux kernel layer 204 may hide specific hardware details, to provide a unified service for upper layers (the system runtime library layer 203, the application program framework layer 202, and the application program layer 201).

For example, still as shown in FIG. 3, the Linux kernel layer 204 may include a system resource manager 321 and/or a device driver 323. The system resource manager 321 may include a process manager (not shown), a memory manager (not shown), and a file system manager (not shown). The system resource manager 321 may control, allocate, and restore a system resource and the like. For example, the device driver 323 may include a display driver (not shown), a camera driver (not shown), a Bluetooth driver (not shown), a shared memory driver (not shown), a USB driver (not shown), a key area driver (not shown), a Wi-Fi driver (not shown), and/or an audio driver (not shown). In addition, in this embodiment disclosed in this application, the device driver 323 may include an interprocess communication (IPC) driver (not shown).

The system runtime library layer 203 includes some C/C++ libraries, for example, a media library, a system C library, and a display management library (surface manager). These libraries can be used by different components in the Android system, so that a new function is added to the application by using a programming language during running. In this embodiment disclosed in this application, the system runtime library layer 203 may perform functions related to input and output, memory management, an arithmetic function, and the like.

The framework layer 202 provides a developer with an API framework that can be used to fully access an application program. Specifically, the framework layer 202 provides many APIs for developing an application program, and the framework layer 202 may provide a function for an application (APP) at the app layer 201 by using the API, so that the application can efficiently use a limited system resource in an electronic device.

For example, as shown in FIG. 3, the API framework provided by the framework layer 202 includes at least one of the following, including an application manager 341, a window manager 342, a multimedia manager 343, a resource manager 344, a power manager 345, a database manager 346, a package manager 347, a connection manager 348, a notification manager 349, a location manager 340, a graphics manager 341, a security manager 352, and any other proper and/or similar manager.

In this embodiment of this application, the tablet computer 100 may support a display function of a plurality of application windows. In the plurality of application windows, each application window corresponds to one application (the application runs in the operating system in an activity form). When the tablet computer 100 simultaneously opens the plurality of application windows, a plurality of activities respectively corresponding to the plurality of application windows are simultaneously visible, but only one activity (namely, a focus activity) currently operated by the user is at a top layer.

Implementation of the foregoing multi-application window function mainly depends on two system services: an application management service (Activity Manager Service) provided by the application manager 341 in the framework layer 202 and a window management service (Window Manager Service) provided by the window manager 342 in the framework layer 202.

The activity manager service is responsible for managing a lifecycle of each application. The activity manager service includes an application record (Activity Record) corresponding to each activity, and the activity record records a state of the activity of the application. The activity manager service uses the activity record as an identifier to schedule an activity process of the application.

The window manager service is responsible for managing a graphical user interface (graphical user interface, GUI) resource used on a screen. The management may specifically include window creation and deletion, window display and hiding, window layout, focus management, input method and wallpaper management, and the like.

Each activity includes an application window belonging to the activity. The window manager service periodically refreshes display content and window parameters (for example, a size and a location that are of the application window) in the application window. In addition, the window manager service may create a window state corresponding to each application window for each application window. The window manager service identifies the application window based on the window state and uses the window state to store, query, and control a state of the application window.

For example, the window manager service may query, in a window state of a window 1, whether a state of the window 1 is a full-screen state, a maximized state, a minimized state, or a restored state. The restored state is a state in which the application window is displayed and can be dragged in a default size of a system or a size set by the user.

The application program layer 201 mainly includes an app compiled in a java language. When operating an operational window of the app, the user may interact, by invoking a related API at the framework layer 202, with the system runtime library layer 203 or the Linux kernel layer 204, to implement a function corresponding to the operational window.

For example, still as shown in FIG. 3, the application program layer 201 may include a system-level application and/or a third-party application, for example, a home page application 371, a dialer application 372, a WeChat application 373, a map application 374, a browser application 375, a camera application 376, an alarms application 377, a contacts application 378, a voice dialing application 379, an email application 380, a calendar application 381, a media player application 382, an album application 383, a clock application 384, and any other proper and/or similar application.

In addition, the display function of the plurality of application windows in this embodiment of this application means that the terminal has a capability of displaying the plurality of application windows at a same moment. However, it should be noted that if the user starts only one application, the terminal may display only an application window of the application during running.

Figure 4A:
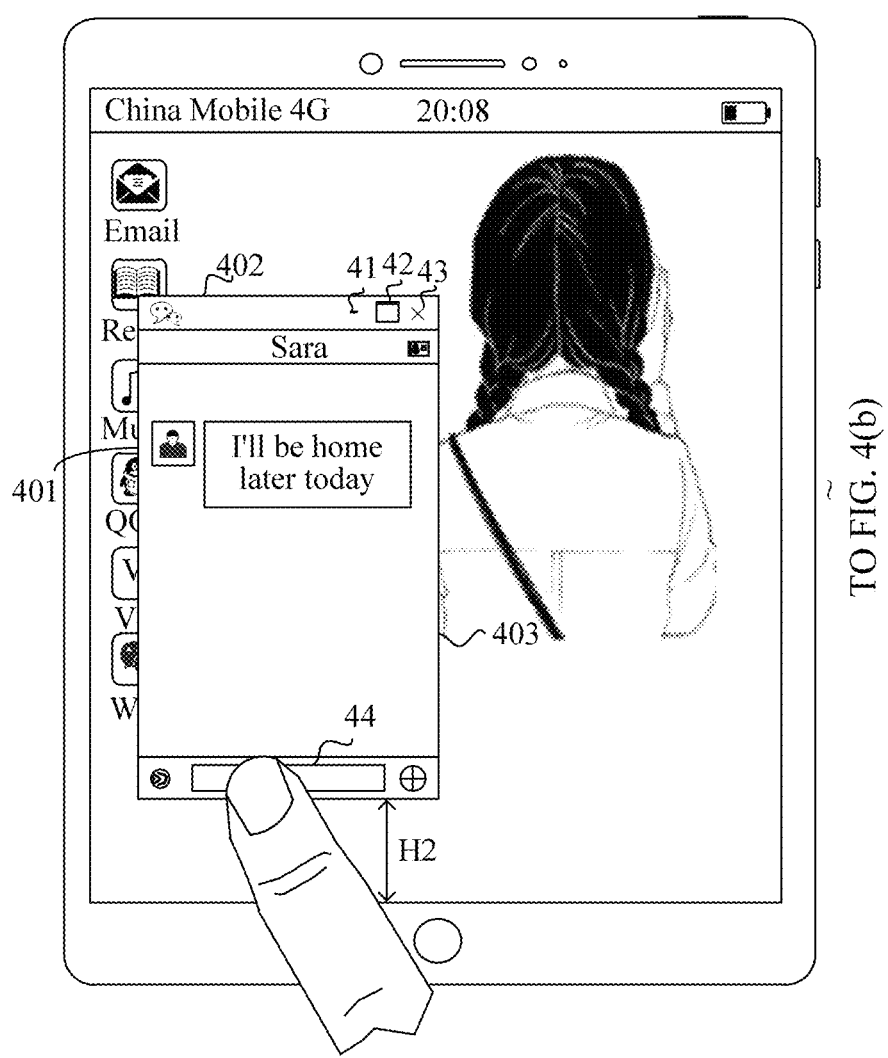
FIG. 4(a) and FIG. 4(b) are a schematic diagram 2 of a display scenario of a plurality of application windows in the prior art.

In this case, an example in which the terminal runs the WeChat application 373 is used. As shown in FIG. 4(a), an application window 401 of the WeChat application 373 includes a headline 402 and a specific chat screen 403. The application window 401 is currently in a restored state, and the headline 402 of the application window 401 is further provided with a maximize button 41, a minimize button 42, and a close button 43. The user may change a state of the application window 401 by tapping these buttons.

Figure 4B:
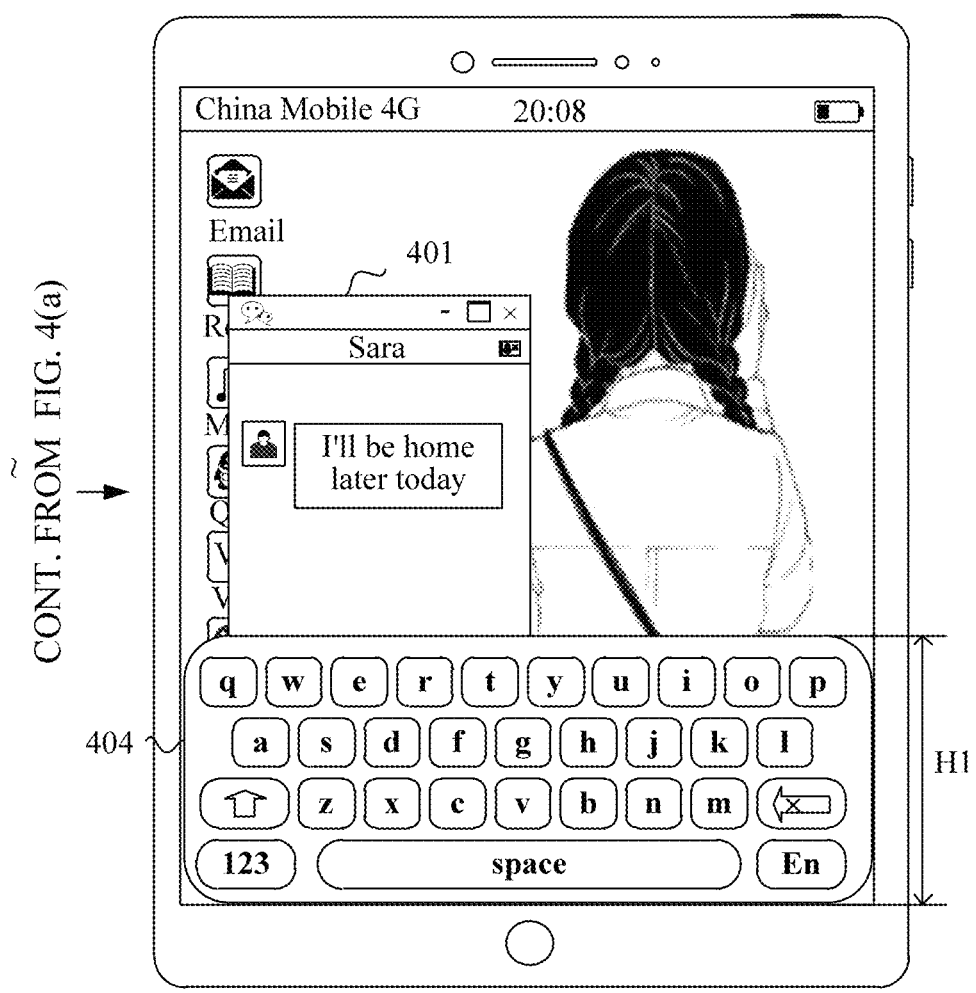

In addition, the chat screen 403 is provided with an input box 44, and the user may enter chat information in the input box 44 by using a soft keyboard provided by an input method application. When detecting that the user taps the input box 44, as shown in FIG. 4(b), in the prior art, the terminal may display a soft keyboard 404 at a fixed location on the screen, for example, at the bottom of the screen. In this case, if a height H1 of the soft keyboard 404 is greater than a distance H2 between the application window 401 and the bottom of the screen, the soft keyboard 404 blocks some or all display content of the application window 401. Consequently, input efficiency and input experience of the user are reduced.

In this case, in the application window display method provided in this embodiment of this application, when drawing each application window, the terminal may detect in real time whether a soft keyboard provided by an input method application is opened in a currently drawn application window (for example, an application window A). If the soft keyboard provided by the input method application is opened, the terminal may use an area on a screen other than the soft keyboard as a drawing area in which the application window is allowed to be drawn, and further adjust a window parameter such as a size or a location of the application window A, so that the terminal draws the application window A in the drawing area.

In this way, when both the application window A and the soft keyboard are displayed, there is no overlapping or blocking between the application window A and the soft keyboard. To be specific, when the terminal that supports a multi-application window function provides an input method service for each application window, the soft keyboard does not block the application window, and therefore input efficiency and input experience of a user are not affected.

It should be noted that the phenomenon of blocking or overlapping between the soft keyboard and the application window in this embodiment of this application is a phenomenon that a boundary of the application window cannot be completely displayed on the screen because the soft keyboard occupies specific display space on the screen during display. In this embodiment of this application, non-blocking or non-overlapping between the soft keyboard and the application window means that when the terminal displays both the application window and the soft keyboard on the screen, all boundaries of the application window may be completely displayed in an area outside the soft keyboard.

Figure 5:
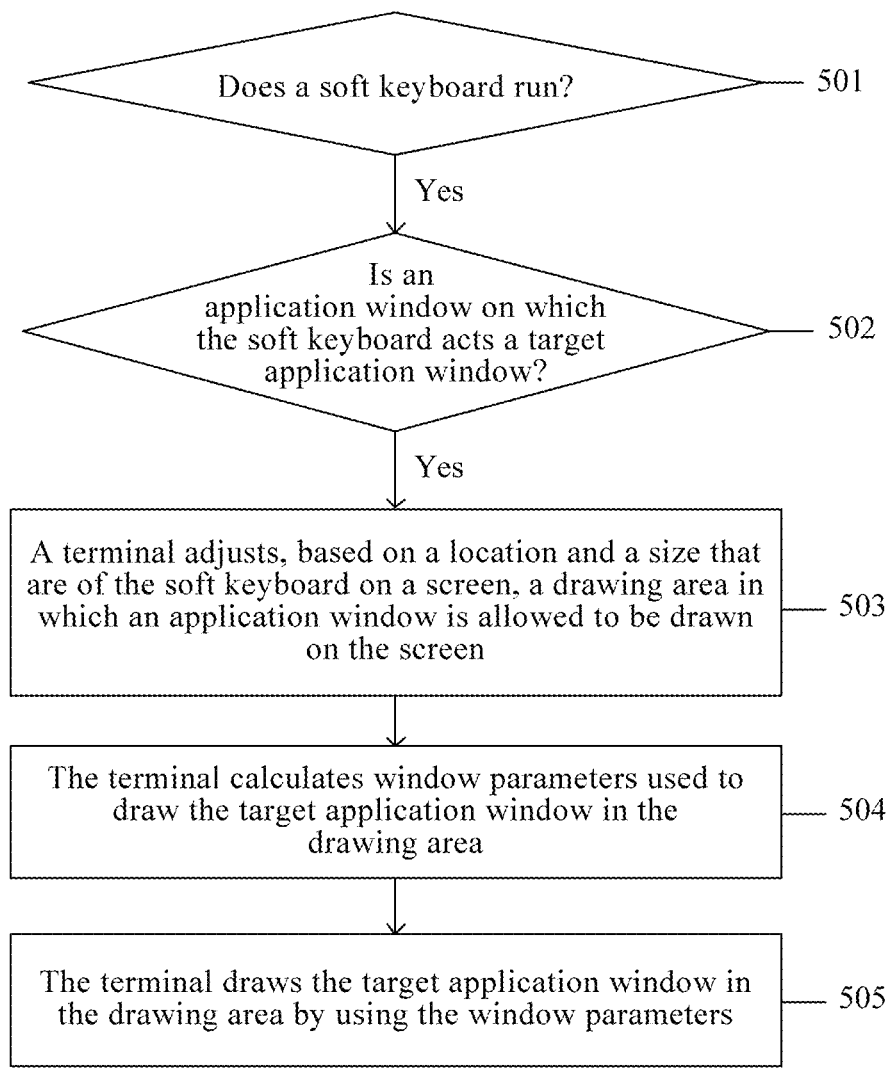
FIG. 5 is a schematic flowchart 1 of an application window display method according to an embodiment of this application.

The following describes in detail an application window display method provided in an embodiment of this application. As shown in FIG. 5, the method includes the following steps.

S501. A terminal detects whether a soft keyboard provided by an input method application runs currently.

If the soft keyboard provided by the input method application runs currently, the terminal may continue to perform step S502, or if the soft keyboard provided by the input method application does not run currently, the terminal may draw a to-be-drawn target application window on a screen by still using the prior art.

In a process of displaying an image, the terminal usually refreshes each frame of display picture on the screen at a fixed frame rate (for example, 60 hertz). When drawing each frame of display picture, the terminal needs to draw each application window in the display picture. Therefore, when drawing each application window in each frame of display picture, the terminal may reference the application window display method provided in steps S501 to S505.

Certainly, when display content in an application window changes, or an operation such as tap, touch and hold, or sliding that is entered by a user is received in an application window, the terminal may also draw the application window with reference to the method provided in steps S501 to S505.

For example, the to-be-drawn application window is used as a target application window. Before drawing the target application window, the terminal may obtain an identifier (for example, a package name of an application or an ID of a main thread) of a currently running application, to query whether the currently running application includes the input method application.

When the input method application runs, an input method manager (input method manager) at a framework layer usually provides an input method service for the application, and the input method manager may manage a running state of the soft keyboard. In this case, the terminal may request the input method manager to query whether the soft keyboard is opened in the currently running input method application.

Alternatively, the terminal may further preset a flag bit used to indicate a running state of the input method application. For example, when a value of the flag bit is 1, it indicates that the soft keyboard of the input method application is opened, or when a value of the flag bit is 0, it indicates that the soft keyboard of the input method application is closed. In this case, when the soft keyboard is opened in the input method application, the input method manager may set the value of the flag bit to 1, or when the soft keyboard is closed in the input method application, the input method manager may set the value of the flag bit to 0. In this way, before drawing the target application window, the terminal may determine, by reading the value of the flag bit, whether the soft keyboard runs currently.

Alternatively, before drawing the target application window, the terminal may further obtain specific display content displayed on a current screen. Further, the terminal may detect whether the display content includes the soft keyboard provided by the input method application, to determine whether the soft keyboard runs currently.

In some other embodiments of this application, when the soft keyboard of the input method application is opened, the input method manager may be triggered to send a keyboard open event to a window manager. The window manager may subsequently draw each target application window according to steps S502 to S505. When the soft keyboard of the input method application is closed, the input method manager may be triggered to send a keyboard close event to a window manager. In this case, the window manager may subsequently draw each to-be-drawn target application window on the screen by still using the prior art.

S502. The terminal determines whether an application window on which the soft keyboard acts is the to-be-drawn target application window.

If the application window on which the soft keyboard acts is the to-be-drawn target application window, the terminal may continue to perform step S503, or if the application window on which the soft keyboard acts is not the to-be-drawn target application window, the terminal may draw the to-be-drawn target application window on the screen by still using the prior art.

In step S502, if the terminal detects that the soft keyboard runs currently, the terminal may further determine an application window for which the soft keyboard provides an input method service, and determine whether the application window for which the input method service is provided is the target application window to be drawn by the terminal.

For example, if a display picture currently drawn by the terminal includes only one application window, the application window is the target application window to be drawn by the terminal, and an application window for which the current soft keyboard provides the input method service is also the target application window.

Alternatively, if a currently drawn display picture includes a plurality of application windows, an application window for which the current soft keyboard provides the input method service is usually an application window of a focus application (namely, a focus activity) at a top layer of an application stack. In this case, the terminal may obtain an identifier (for example, a package name of the focus application) of the focus application and an identifier of the target application window to be drawn by the terminal. When the identifier of the focus application is the same as the identifier of the target application window, it may be determined that the application window on which the current soft keyboard acts is the to-be-drawn target application window.

S503. The terminal adjusts, based on a location and a size that are of the soft keyboard on the screen, a drawing area in which an application window is allowed to be drawn on the screen.

Figure 6:
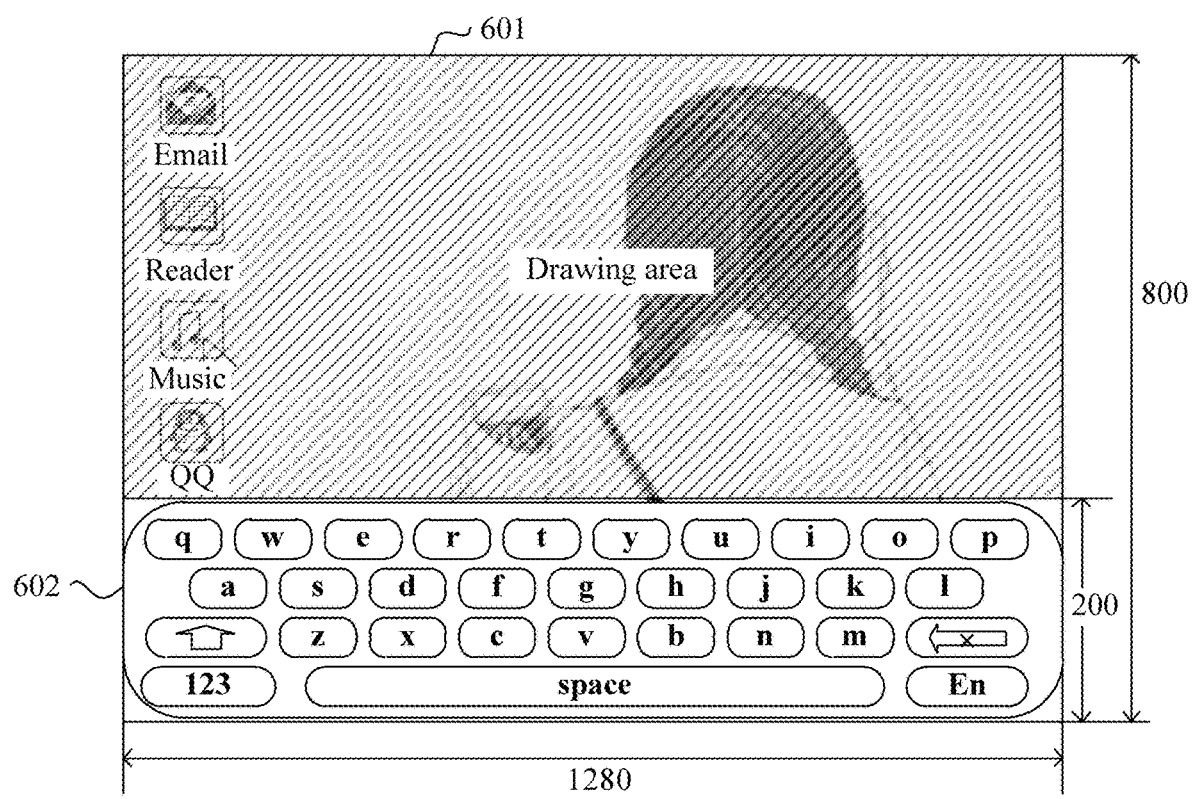
FIG. 6 is a schematic scenario diagram 1 of an application window display method according to an embodiment of this application.

In step S503, if the terminal determines that the application window on which the current soft keyboard acts is the target application window, the terminal may obtain the location and the size that are of the soft keyboard on the screen. As shown in FIG. 6, in a screen 601 with a size of 1280×800, a size of a soft keyboard 602 is 1280×200, and the soft keyboard 602 is located at the bottom of the screen 601.

Herein, 1280×800 indicates that the screen 601 includes 1280×800 pixels, and 1280×200 indicates that the soft keyboard 602 includes 1280×200 pixels. In subsequent embodiments, a quantity of pixels is used to indicate a size of an application window or a screen. In addition, the size of the screen, the size of the soft keyboard, and the size of the drawing area that are described in the embodiments of the present invention are all examples for description. In a specific implementation, the size of the screen and the size of the soft keyboard may be determined based on a specific situation of the terminal.

A default drawing area in which an application window is allowed to be drawn and that is of the terminal is at any location on the screen 601, namely, an entire screen with a size of 1280×800. Therefore, if a target application window on which the soft keyboard 602 acts is drawn in the drawing area, the target application window may be blocked by the soft keyboard 602.

Therefore, to prevent the soft keyboard 602 from blocking the target application window on which the soft keyboard 602 acts, the terminal may determine an area on the screen 601 other than the soft keyboard 602, namely, an area with a size of 1280×600 that is above the soft keyboard 602, as the drawing area in which the target application window is allowed to be drawn. Subsequently, the terminal may draw the target application window in the adjusted drawing area.

Figure 7A:
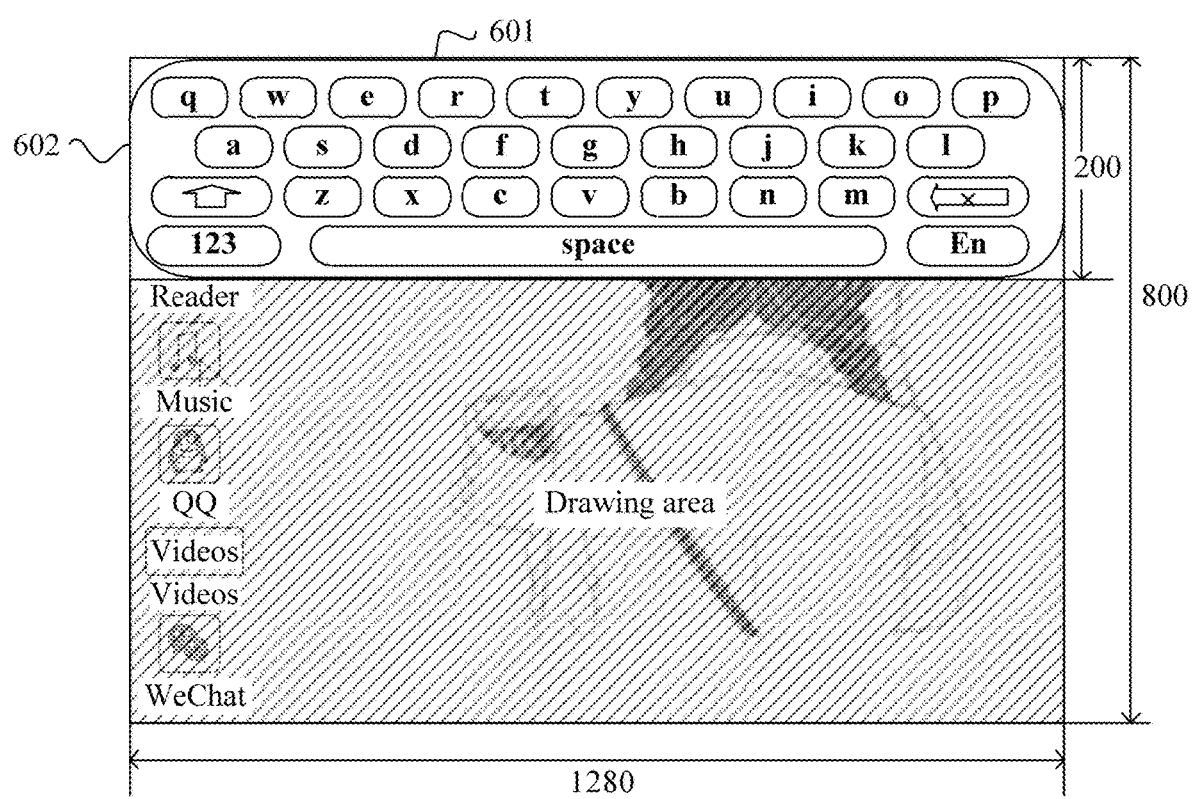
FIG. 7(a) and FIG. 7(b) are a schematic scenario diagram 2 of an application window display method according to an embodiment of this application.
Figure 7B:
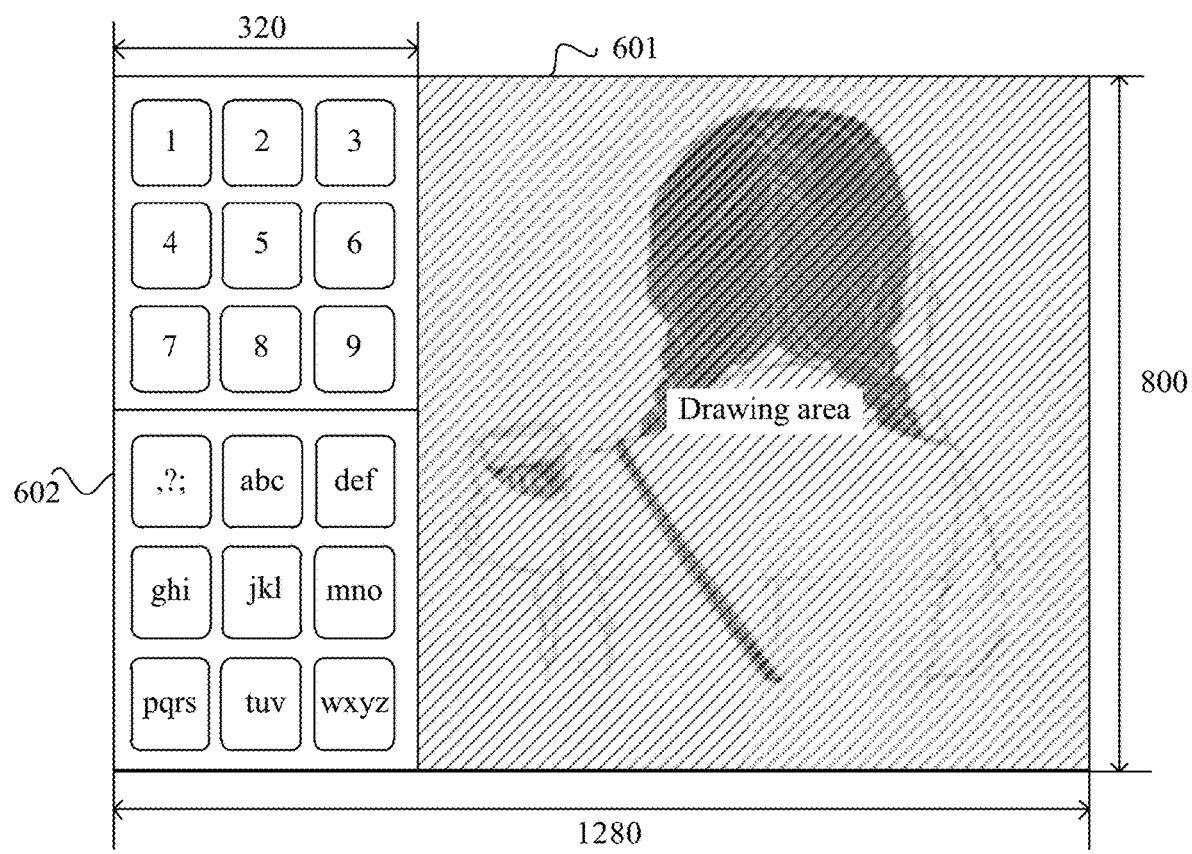

The soft keyboard 602 may be further disposed at another location on the screen 601. For example, as shown in FIG. 7(a), a soft keyboard 602 may be further disposed at the top of a screen 601. In this case, the terminal may use a 1280×600 area located below the soft keyboard 602 on the screen 601 as the drawing area. Alternatively, as shown in FIG. 7(b), a soft keyboard 602 with a size of 320×800 may be further disposed along a side of a screen 601. In this case, the terminal may use a 960×800 area adjacent to the soft keyboard 602 on the screen 601 as the drawing area.

Figure 8:
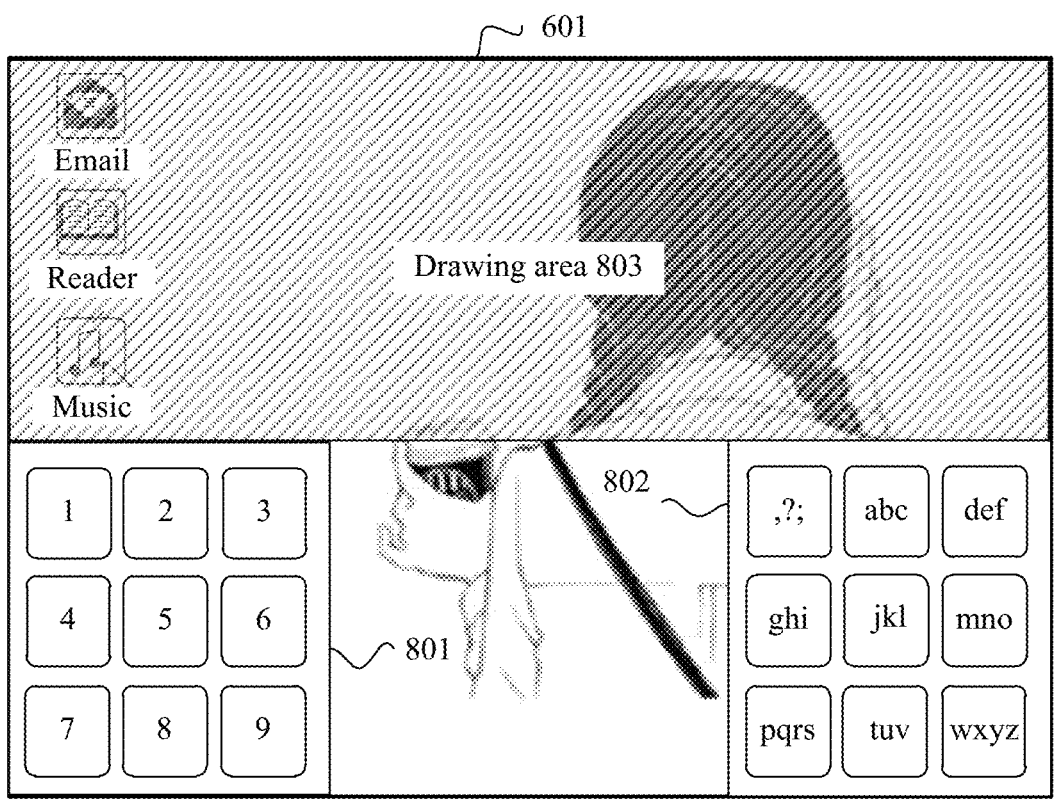
FIG. 8 is a schematic scenario diagram 3 of an application window display method according to an embodiment of this application.

In addition, because the soft keyboard is not necessarily disposed along a boundary of the screen, and a shape of the soft keyboard is not necessarily a regular shape, the area on the screen other than the soft keyboard may be an irregular area. As shown in FIG. 8, a soft keyboard includes a numeric keyboard 801 and an alphabetic keyboard 802 that are respectively disposed on two sides of a screen. In this case, an area on the screen other than the soft keyboard is in an irregular convex shape, and an application window is usually a regular rectangle. Therefore, the terminal may determine a largest rectangle 803 included in the convex area as the drawing area.

Further, after determining the drawing area in which the application window is allowed to be drawn, the terminal may invoke a window management service (Window Manager Service) at a framework layer to modify a drawing parameter that is in a function layoutWindowLw( ) and that is used to define the drawing area, so that the terminal can subsequently draw the application window in the drawing area.

For example, the drawing parameter may include a pf (parent frame) parameter used to indicate a size of a parent window of a window, a df (device frame) parameter used to indicate a size of a screen, a cf (content frame) parameter used to indicate a size of a window content area, a of (visible frame) parameter used to indicate a size of a visible area of a window, a dcf (décor frame) parameter used to indicate a size of a decorative area, or the like. This is not limited in this embodiment of this application.

S504. The terminal calculates window parameters used to draw the target application window in the drawing area.

In step S504, after determining the drawing area used to draw the application window, the terminal may calculate, based on the drawing area, window parameters such as a window size and a window location that are required for drawing the target application window in the drawing area, so that the terminal can subsequently draw the target application window based on the window parameters through calculation.

Figure 9:
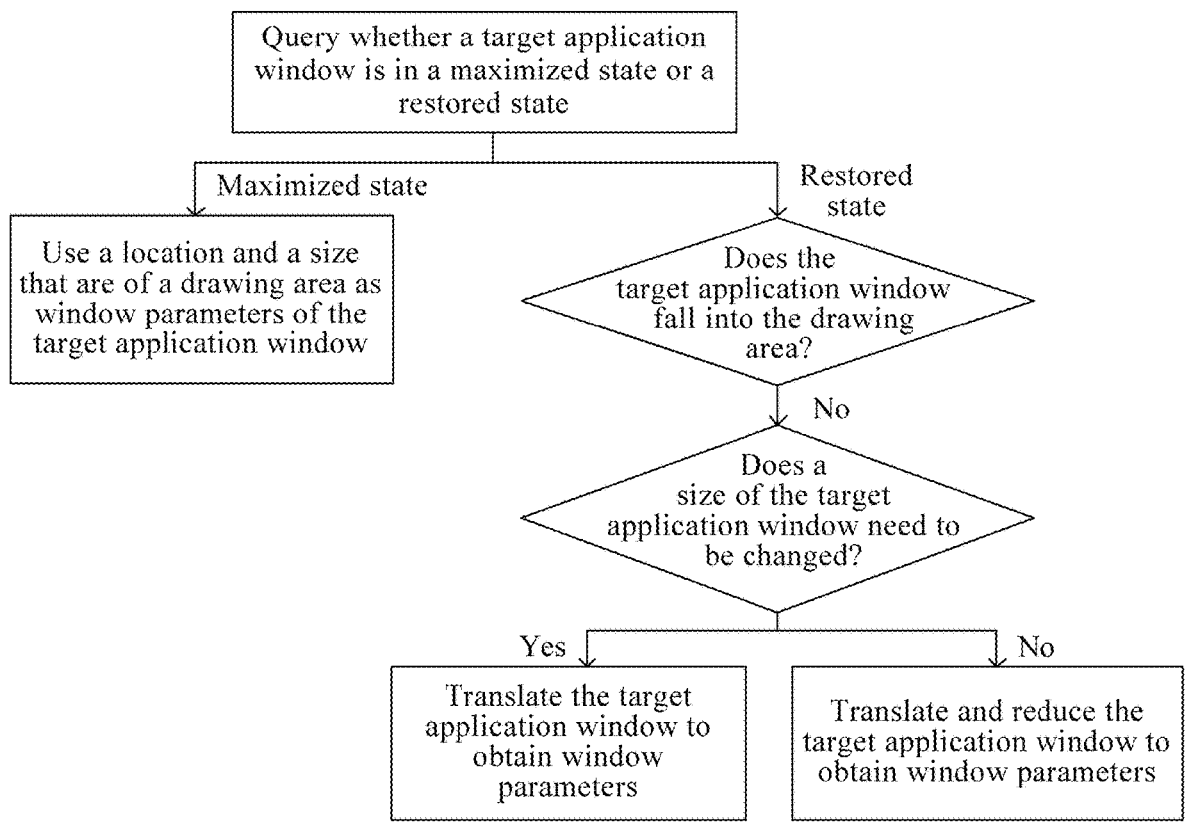
FIG. 9 is a schematic flowchart 2 of an application window display method according to an embodiment of this application.

For example, as shown in FIG. 9, the terminal may first query a state of the to-be-drawn target application window. For example, the window manager service may query, in a window state created for the target application window, whether the target application window is in a maximized state or a restored state.

Figure 10:
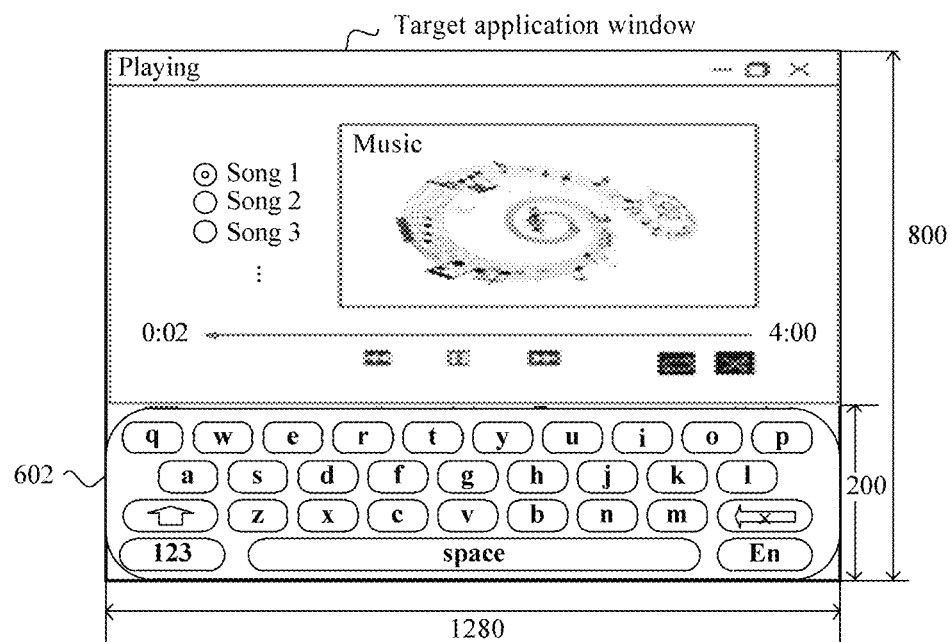
FIG. 10 is a schematic scenario diagram 4 of an application window display method according to an embodiment of this application.

When the state of the target application window is the maximized state, it indicates that the target application window needs to be maximized and drawn in the drawing area. In this case, still as shown in FIG. 9, the terminal may use a location and a size that are of the drawing area on the screen as the window parameters of the target application window. For example, as shown in FIG. 10, an area with a size of 1280×600 that is above a soft keyboard 602 is still used as a drawing area. The terminal may use the size (1280×600) of the drawing area as a size of the target application window, and use a location of the drawing area as a location of the target application window, to display the target application window in the maximized state.

When the state of the target application window is the restored state, the location and the size that are of the target application window are manually set by a user or set by a system by default. In this case, still as shown in FIG. 9, the terminal may first query whether when drawing the target application window last time (in other words, before the soft keyboard is opened), the target application window completely falls within the drawing area determined in step S503. If the target application window completely falls within the drawing area, in other words, all boundaries of the target application window are in the drawing area, it indicates that the soft keyboard displayed at this time does not block the currently drawn target application window. Therefore, the terminal may determine window parameters used when the target application window is drawn last time as window parameters used when the target application window is currently drawn, and further draw the target application window in the drawing area based on the window parameters.

Correspondingly, when the target application window is drawn last time, if the target application window does not completely fall into the drawing area determined in step S503, it indicates that the soft keyboard displayed at this time blocks the currently drawn target application window. Therefore, the terminal may continue to determine whether the size of the target application window needs to be changed when the target application window is currently drawn.

For example, if the window size used when the target application window is drawn last time may be completely set in the drawing area, it indicates that the target application window may be drawn in the drawing area by changing only the location of the target application window without a need to change the size of the target application window at this time. If the window size used when the target application window is drawn last time cannot be set in the drawing area, it indicates that the size of the target application window needs to be reduced based on the target application window drawn last time, and the location of the target application window needs to be changed, so that the terminal can draw the target application window in the drawing area.

Figure 11A:
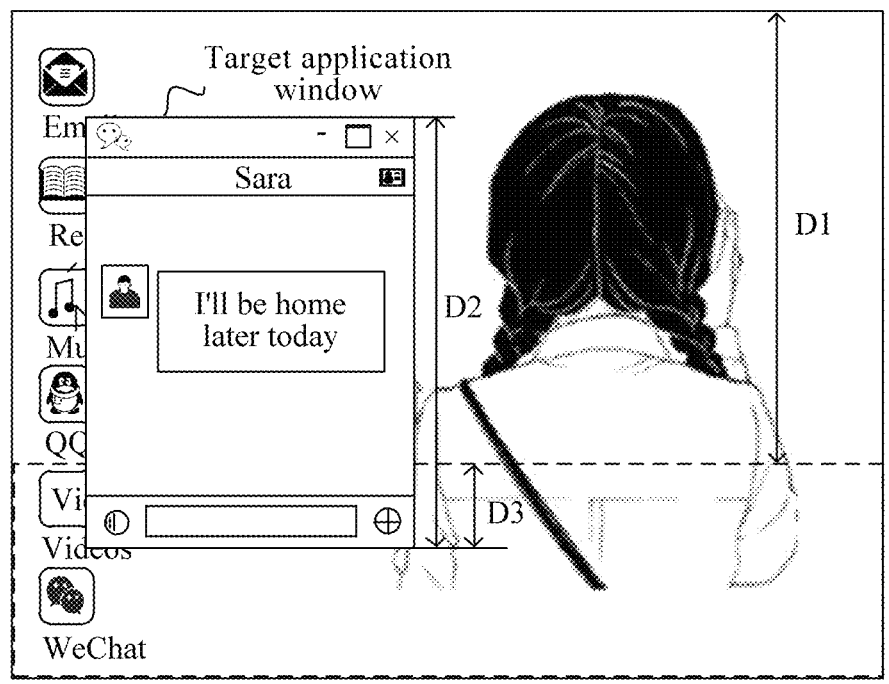
FIG. 11(a) and FIG. 11(b) are a schematic scenario diagram 5 of an application window display method according to an embodiment of this application.

For example, as shown in FIG. 11(a), an area (with a size of 1280×200) in a dashed-line box is usually a location at which the terminal displays the soft keyboard 602, and a height D2 of a target application window is equal to 500, and the target application window partially overlaps the dashed-line box, and a height D3 of the overlapped part is equal to 100. A drawing area is located above the soft keyboard 602 and has a size of 1280×600. In other words, a width K of the drawing area is equal to 1280, and a height D1 of the drawing area is equal to 600. In this case, because D1>D2, the terminal may draw the target application window in the drawing area without changing the size of the target application window. In this case, when the target application window is currently drawn, the size of the target application window is still a size manually set by the user or a default size in the system, and the location of the target application window may be any location in the drawing area.

Figure 11B:
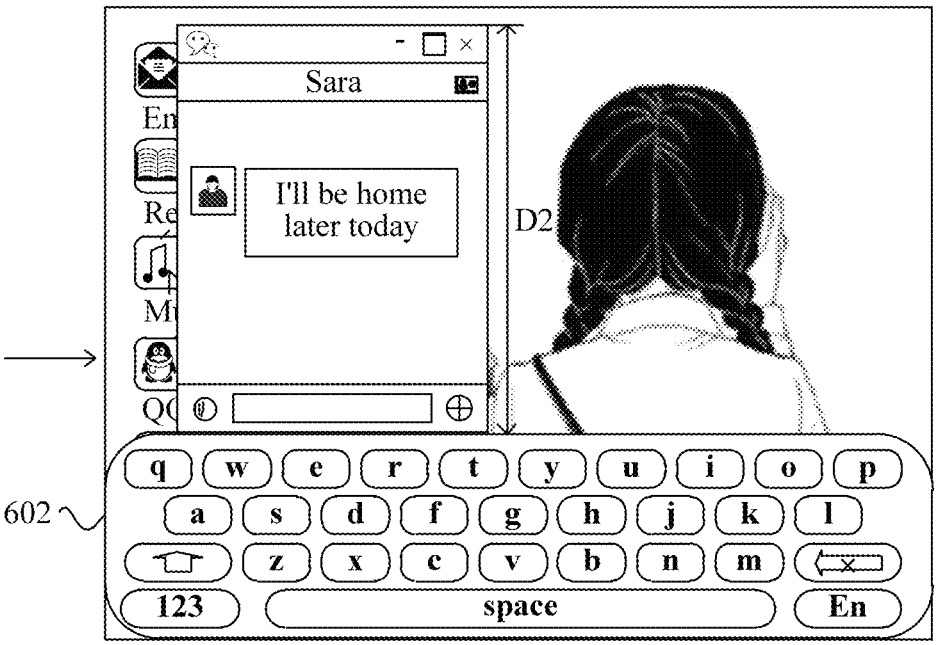

For example, as shown in FIG. 11(b), the terminal may use a location obtained after the target application window is translated upward by a distance D3 as a window location used when the target application window is currently drawn, and use a window size used when the target application window is drawn last time as a window size used when the target application window is currently drawn, to draw the target application window. In this case, as shown in FIG. 11(b), when the user taps an input box in the target application window, the terminal is triggered to display the soft keyboard 602. In this case, the target application window is translated upward to a part above the soft keyboard 602, to prevent the soft keyboard 602 from blocking the target application window.

Certainly, provided that it can be ensured that all boundaries of the target application window do not exceed the drawing area, the terminal may further set the location of the target application window at another location of the drawing area. This is not limited in this embodiment of this application.

Correspondingly, when a height D1 of the drawing area is less than a height D2 of the target application window, in addition to changing the location of the target application window, the terminal needs to change the size of the target application window, so that the target application window can be drawn in the drawing area.

Figure 12A:
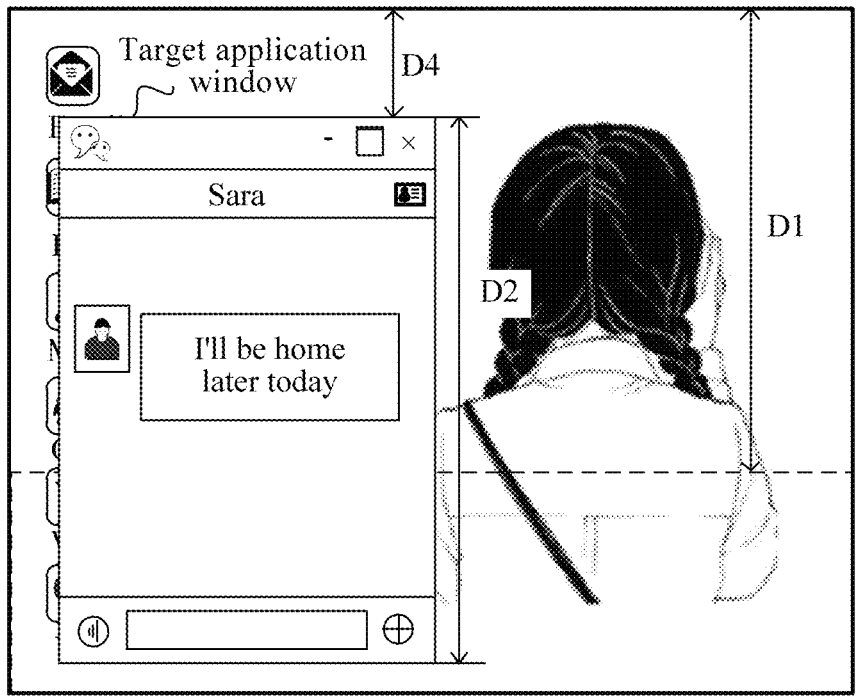
FIG. 12(a) and FIG. 12(b) are a schematic scenario diagram 6 of an application window display method according to an embodiment of this application.

For example, as shown in FIG. 12(a), an area (with a size of 1280×200) in a dashed-line box is usually a location at which the terminal displays the soft keyboard 602, and a height D1 of a drawing area located above the soft keyboard 602 is equal to 600. In this case, a height D2 of a target application window is equal to 700. Because D2>D1, even if the target application window is translated upward by a distance D4 to enable the target application window to be located at the top of a screen, the soft keyboard 602 still blocks some content in the target application window when popping up. In this case, in addition to changing a window parameter, that is, the location of the target application window, the terminal may change a window parameter, that is, the size of the target application window, so that the target application window can be drawn in the drawing area.

Figure 12B:
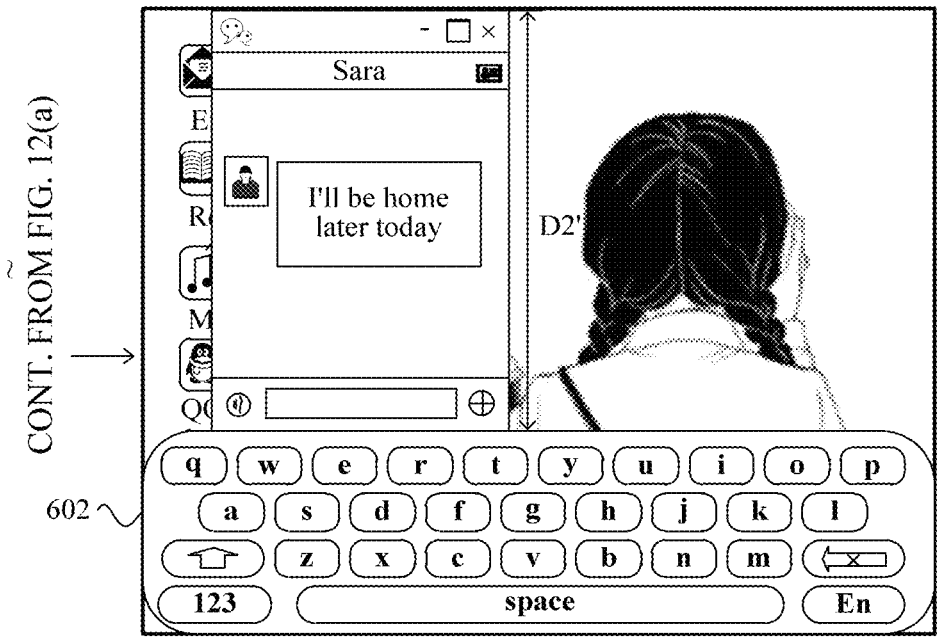

For example, the terminal may first translate the target application window upward by a distance D4, so that the target application window is located at the top of the screen, and then reduces a height D2 of the target application window from 700 to D2' (D2'≤600), to obtain window parameters such as a new window size and a new window location that are used when the target application window is currently drawn. In this case, as shown in FIG. 12(b), when the user taps an input box in the target application window to trigger the soft keyboard 602 to pop up, the target application window is translated upward, and the target application window is scaled down into the drawing area, to prevent the soft keyboard 602 from blocking the target application window.

Further, after determining the window parameters such as the size and the location that are used to draw the target application window, the terminal may invoke a window management service (Window Manager Service) at a framework layer to modify window parameters defined in a function computeFrameLw( ), so that the terminal can subsequently draw the target application window in the drawing area based on the window parameters.

It should be noted that in the foregoing embodiment, the location of the target application window is calculated by using an example in which the terminal translates the target application window in a vertical direction. It may be understood that the terminal may further translate the target application window in any direction while ensuring that there is no blocking between the soft keyboard and the target application window, to obtain, through calculation, the window parameters such as the location and the size that are used to draw the target application window. This is not limited in this embodiment of this application. For example, as shown in FIG. 7(b), when the soft keyboard is disposed along a side of the screen, the terminal may translate the target application window in a horizontal direction, to obtain, through calculation, the window parameters used to draw the target application window.

In addition, the foregoing embodiment is described by using an example in which the screen includes only one application window. It may be understood that when the terminal performs display, the screen may include a plurality of application windows. For a method for drawing each application window, refer to steps S501 to S504, to ensure that the application window for which the soft keyboard provides the input method service is not blocked by the soft keyboard during display.

Figure 13:
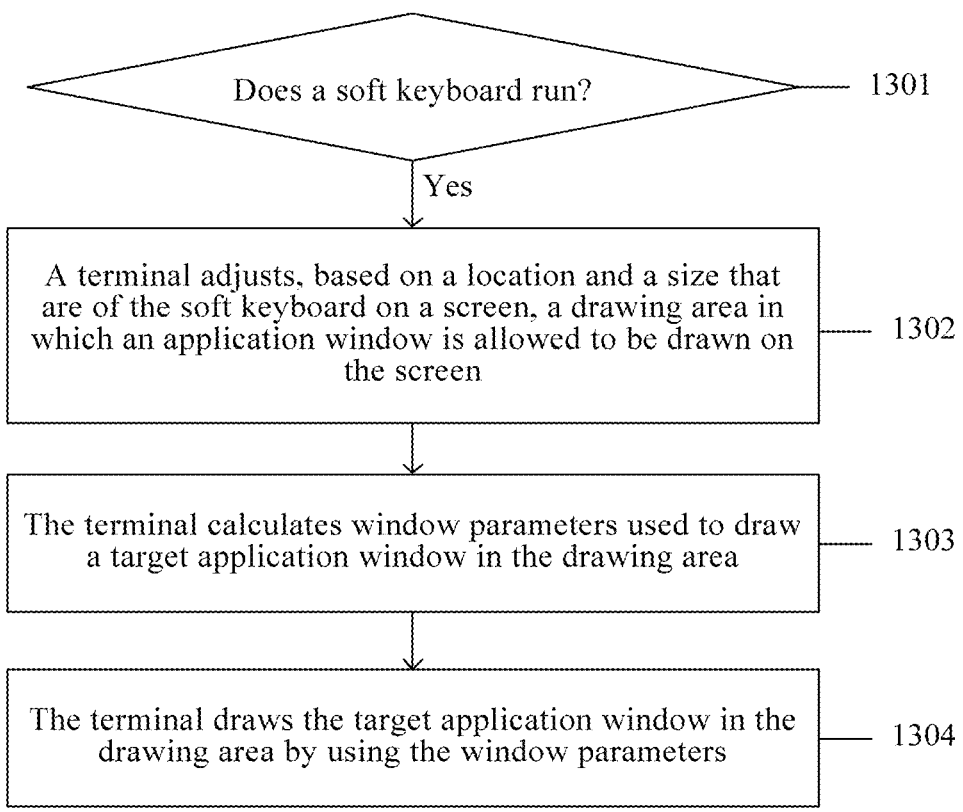
FIG. 13 is a schematic flowchart 3 of an application window display method according to an embodiment of this application.

In another embodiment provided in this application, when drawing each application window on a screen, the terminal may further reference an application window display method shown in FIG. 13.

Different from the application window display method shown in FIG. 5, in steps S1301 to S1304, when the terminal detects that a soft keyboard provided by an input method application runs currently, the terminal does not need to determine whether a currently to-be-drawn target application window is an application window on which the soft keyboard acts, but calculates, according to steps same as steps S503 to S505, a location and a size that are of a drawing area on the screen and window parameters of a target application window that are used to draw the target application window, and draws the target application window in the drawing area by using the window parameters.

In other words, in an application scenario in which the soft keyboard runs, when drawing any application window, the terminal may draw the application window in a drawing area that does not overlap the soft keyboard. In this way, the application window for which the soft keyboard provides the input method service is not blocked by the soft keyboard during display, and another application window on the terminal screen is not blocked by the soft keyboard during display.

Figure 14A:
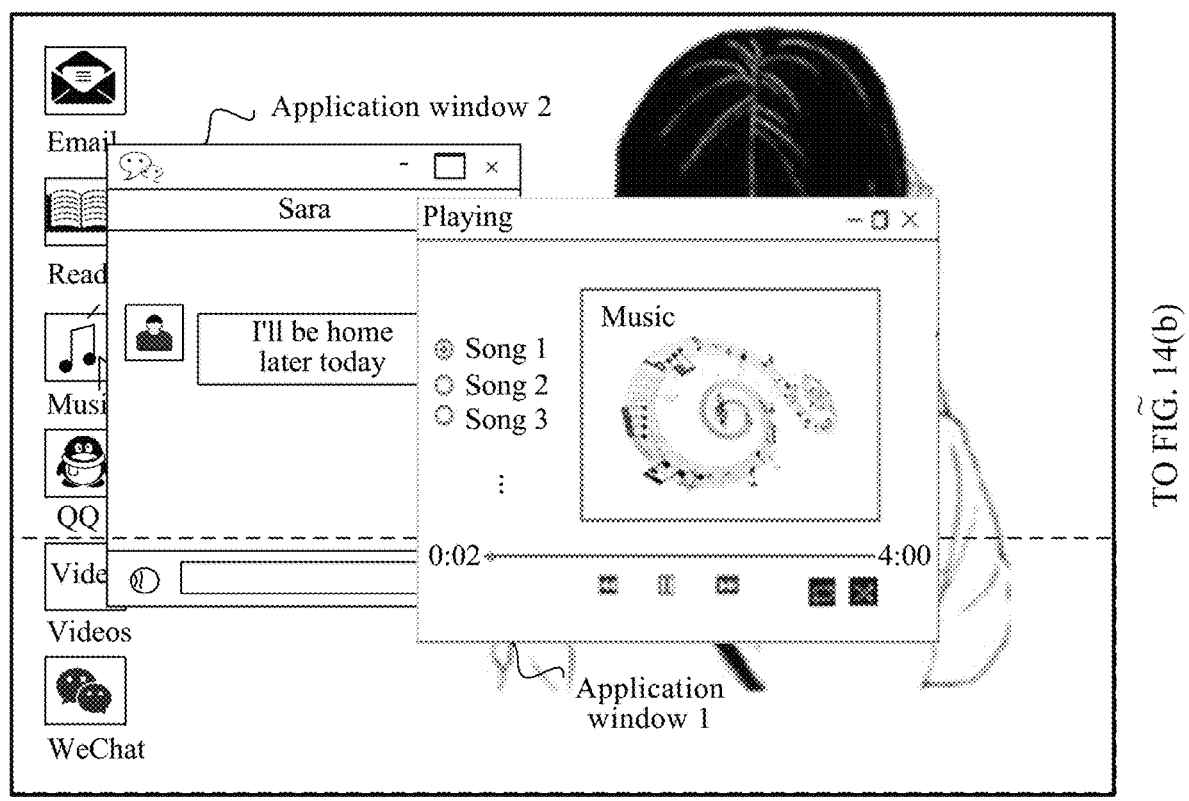
FIG. 14(a) and FIG. 14(b) are a schematic scenario diagram 7 of an application window display method according to an embodiment of this application.

For example, as shown in FIG. 14(a), an application window 1 and an application window 2 are displayed on a screen. When the user taps an input box in the application window 2, an input method application may be triggered to open a soft keyboard to provide an input method service.

Figure 14B:
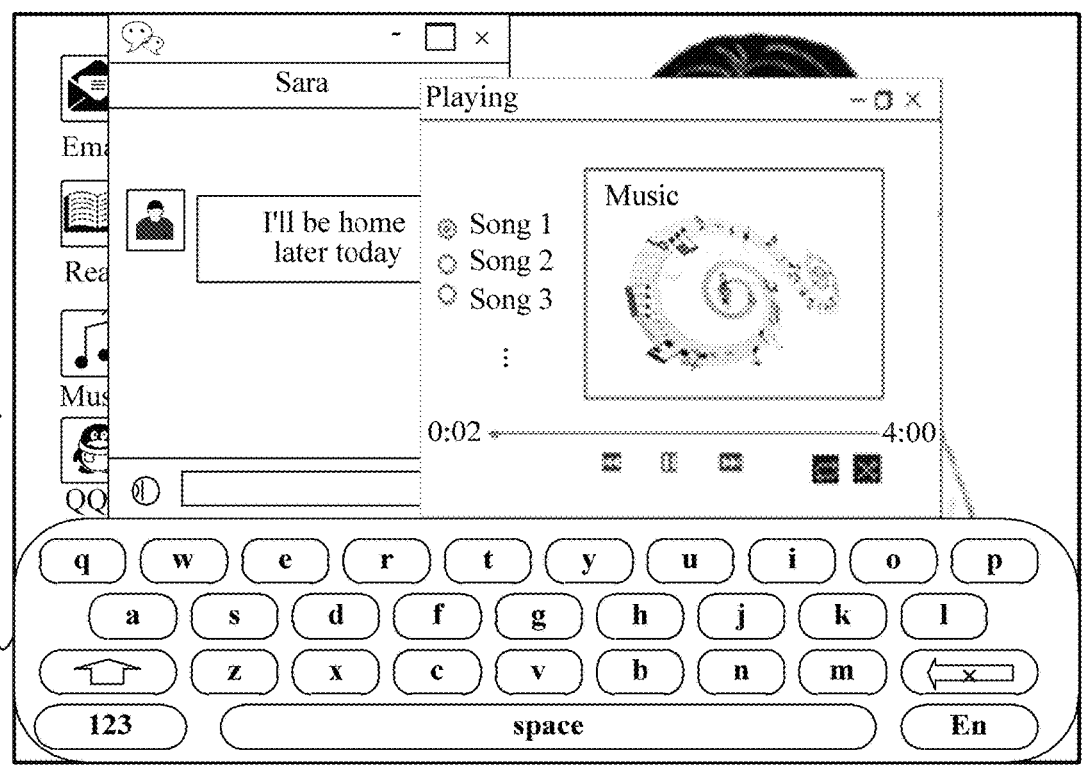

An area (with a size of 1280×200) in a dashed-line box in FIG. 14(*a*) is usually a location at which the terminal displays the soft keyboard 602. In this case, when the terminal draws the application window 1, if the terminal detects that the soft keyboard 602 is already opened, the terminal may determine an area with a size of 1280×600 that is located above the dashed-line box as the drawing area in which the application window is allowed to be drawn. Further, as shown in FIG. 14(*b*), the terminal may adjust a window parameter such as a location or a size of the application window 1, and draw the application window 1 in the drawing area. In this case, although the soft keyboard 602 does not provide the input method service for the application window 1, display content in the application window 1 is not blocked by the soft keyboard 602, to improve a display effect of displaying a plurality of application windows.

Further, when the screen includes a plurality of to-be-drawn application windows (for example, the application window 1 and the application window 2), when determining window parameters of the application window 1 and the application window 2, the terminal may further specify that locations of the two application windows do not overlap.

Figure 15A:
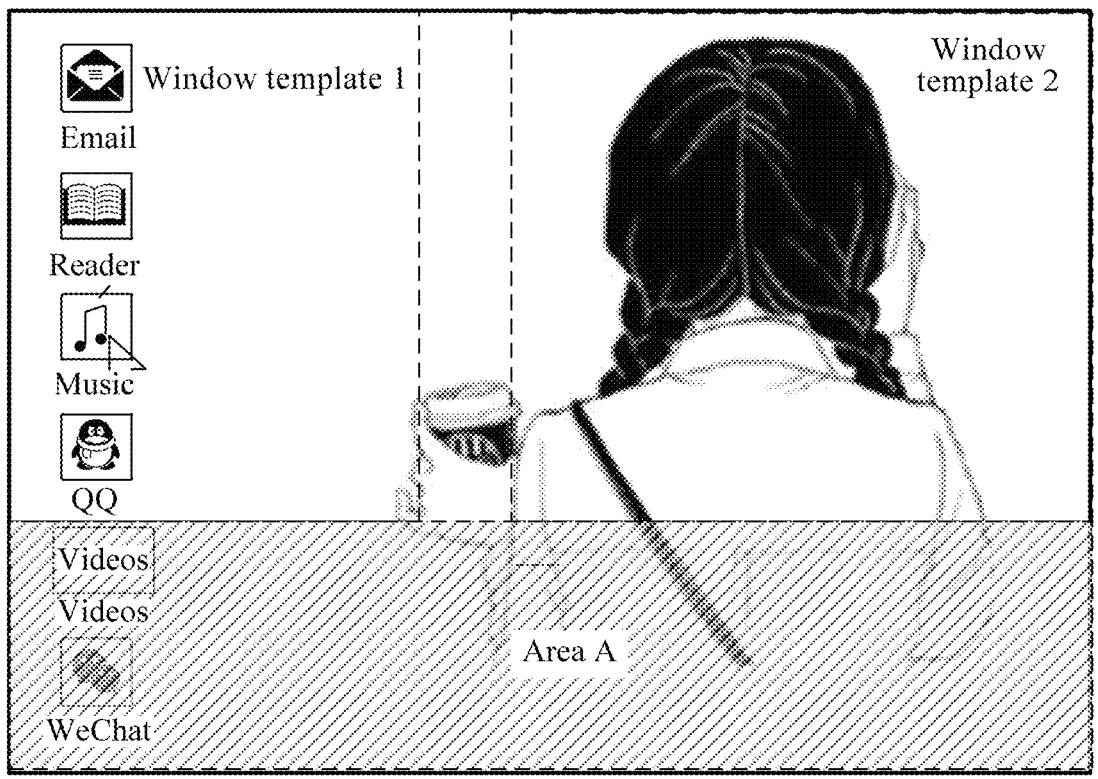
FIG. 15(a) and FIG. 15(b) are a schematic scenario diagram 8 of an application window display method according to an embodiment of this application.
Figure 15B:
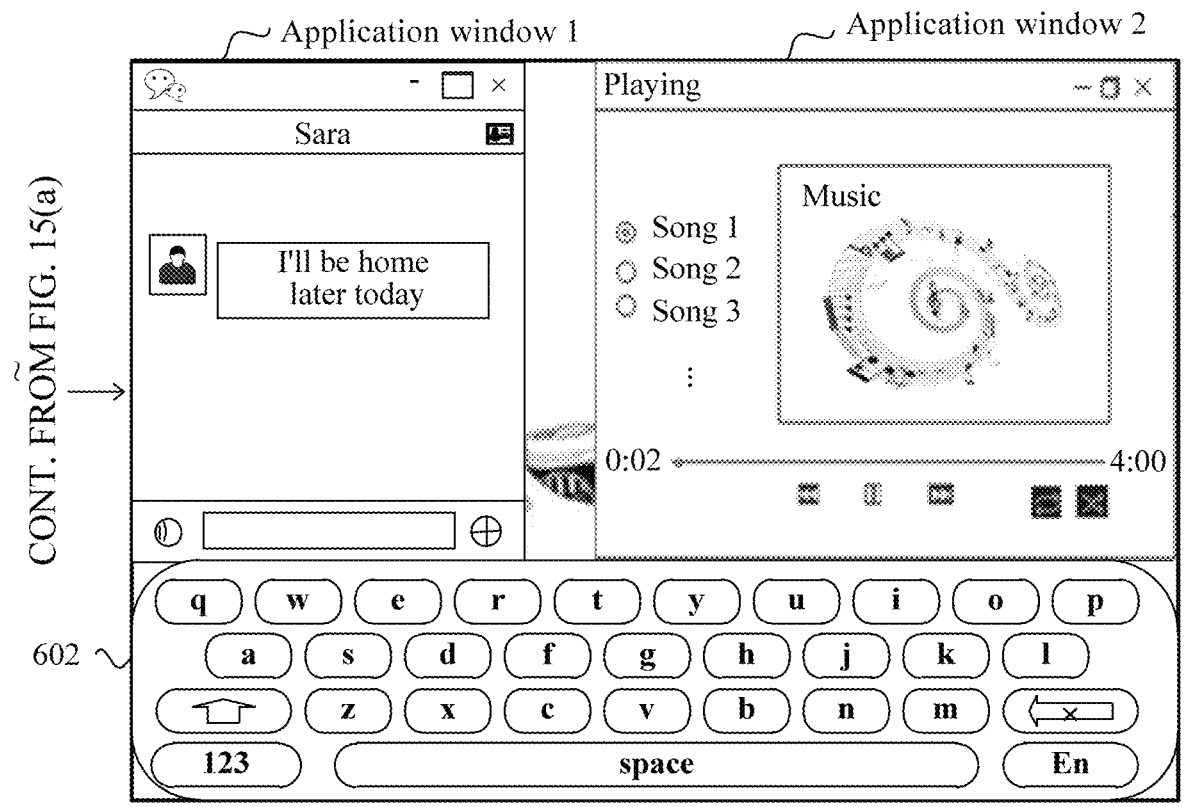

For example, as shown in FIG. 15(*a*), an area A with a size of 1280×200 on the screen is usually a location at which the terminal displays the soft keyboard 602. In this case, the terminal may divide, in advance, a drawing area with a size of 1280×600 above the area A into a plurality of window templates that do not overlap, for example, a window template 1 and a window template 2.

Sizes and locations of the window template 1 and the window template 2 may be pre-stored in the terminal. In this case, when calculating window parameters of the application window 1, the terminal may use the size and the location that are of the window template 1 as the window parameters of the application window 1. When calculating window parameters of the application window 2, the terminal may use the size and the location that are of the window template 2 as the window parameters of the application window 2. In this way, as shown in FIG. 15(*b*), because the window template 1 and the window template 2 do not overlap, the application window 1 and the application window 2 that are subsequently drawn by the terminal do not overlap, to avoid blocking between the plurality of application windows when the plurality of application windows are displayed.

S505. The terminal draws the target application window in the drawing area by using the window parameters.

According to steps S501 to S504, the terminal may obtain the window parameters specifically used when the target application window is currently drawn. Therefore, in step S505, the terminal may invoke a service SurfaceFlinger in a system service to transfer the window parameters calculated for the target application window in step S504 to the service SurfaceFlinger, and the service SurfaceFlinger is responsible for drawing, based on the window parameters, specific display content of the target application window in the drawing area determined in step S503. Finally, a display of the terminal displays the drawn target application window.

Figure 16:
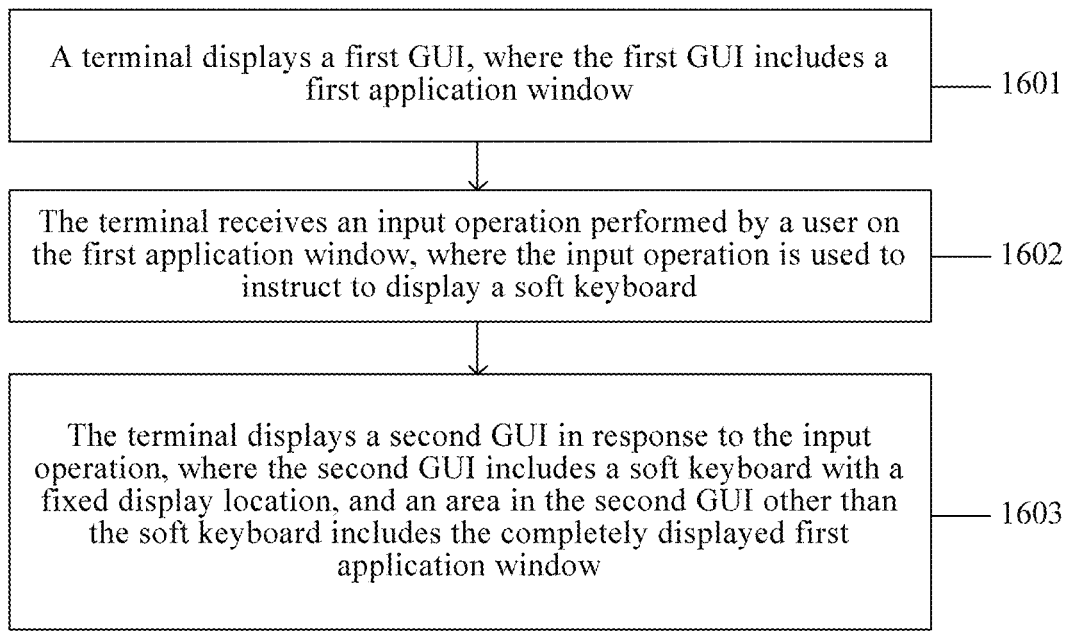
FIG. 16 is a schematic flowchart 4 of an application window display method according to an embodiment of this application.

It should be noted that the foregoing embodiment is described by using a drawing procedure in which the terminal draws each application window in each display picture as an example. The following describes, by using a display scenario in which the terminal switches between two display pictures as an example, an application window display method provided in an embodiment of this application. As shown in FIG. 16, the method includes the following steps.

S1601. The terminal displays a first GUI, where the first GUI includes a first application window.

S1602. The terminal receives an input operation performed by a user on the first application window, where the input operation is used to instruct to display a soft keyboard.

A fixed display location preset for the soft keyboard on a terminal screen partially or completely overlaps a display location of the first application window in the first GUI.

In step S1601, for the terminal that supports displaying a plurality of application windows, when one or more application windows run in the terminal, the terminal may display the first GUI. FIG. 11(*a*) is used as an example. The first GUI displayed by the terminal includes a target application window (namely, the first application window) of a WeChat application.

In step S1602, when the user needs to enter information such as a text in the first application window, the user may perform an input operation in an input box in the first application window, to trigger the terminal to display, at a fixed location on the screen, the soft keyboard provided by an input method application. Still as shown in FIG. 11(*a*), the soft keyboard is usually fixedly displayed in a dashed-line area shown in FIG. 11(*a*). If the first application window displayed in the first GUI overlaps the dashed-line area, when the terminal subsequently displays the soft keyboard in the dashed-line area, the soft keyboard blocks a display element in the first application window. Therefore, in this embodiment of this application, when displaying, in response to the input operation, a second GUI including the soft keyboard, the terminal may perform step S1603 to prevent the soft keyboard from blocking the first application window.

S1603. The terminal displays the second GUI in response to the input operation, where the second GUI includes the soft keyboard at the fixed display location, and an area in the second GUI other than the soft keyboard includes the completely displayed first application window.

Specifically, when performing step S1603, the terminal may first draw the soft keyboard at a fixed location (for example, in a dashed-line area shown in FIG. 11(*a*)) in the second GUI, and then when drawing the first application window in the second GUI, the terminal may draw, by still using the method in steps S501 to S505 or S1301 to S1304 (details are not described herein again), the first application window in the second GUI in a drawing area that does not overlap the soft keyboard.

It should be noted that because the terminal first draws the soft keyboard when drawing the first application window in the second GUI, the terminal can detect, when performing step S501 or S1301, that the soft keyboard is already opened. In this case, when drawing the first application window in the second GUI, the terminal may not perform step S501 or S1301, that is, perform steps S502 to S505 or S1302 to S1304 to draw the first application window in the drawing area, so that the drawn first application window in the second GUI is not blocked by the soft keyboard.

It should be noted that in another implementation, in step S1602, if the fixed display location preset for the soft keyboard on the terminal screen does not overlap the display location of the first application window in the first GUI, that is, after the soft keyboard is opened for display, the soft keyboard completely does not block the first application window. In this case, the terminal may display the soft keyboard at the fixed location in the second GUI in response to the input operation, and draw the first application window in the second GUI based on a location and a size that are of the first application window in the first GUI.

It can be understood that to implement the foregoing functions, the terminal or the like includes corresponding hardware structures and/or software modules for performing the functions. A person skilled in the art should be easily aware that units, algorithms, and steps in the examples described with reference to the embodiments disclosed in this specification may be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division in an actual implementation.

Figure 17:
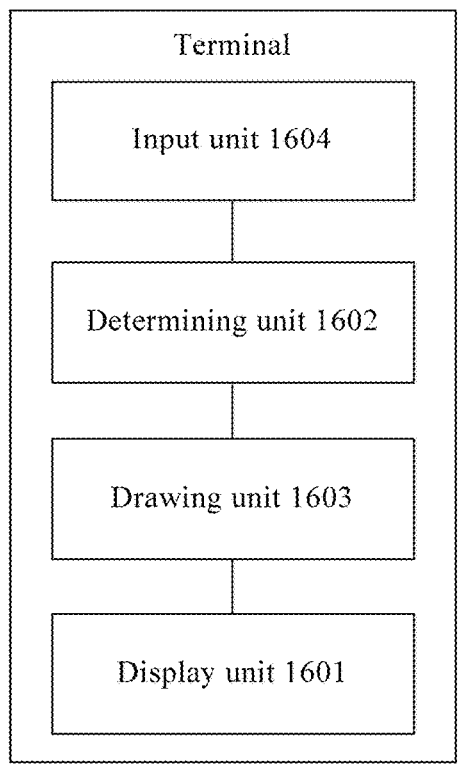
FIG. 17 is a schematic structural diagram 2 of a terminal according to an embodiment of this application.

When each function module is obtained through division based on each corresponding function, FIG. 17 is a possible schematic structural diagram of the terminal in the foregoing embodiments. The terminal is configured to implement the method recorded in the foregoing method embodiments, and specifically includes a display unit 1601, a determining unit 1602, a drawing unit 1603, and an input unit 1604.

The display unit 1601 is configured to display a first GUI, where the first GUI includes a first application window. The input unit 1604 is configured to receive an input operation performed on the first application window. The display unit 1601 is further configured to display a second GUI, where the second GUI includes a soft keyboard at a fixed display location, and an area in the second GUI other than the soft keyboard includes the completely displayed first application window, and the display location of the soft keyboard in the second GUI partially or completely overlaps a display location of the first application window in the first GUI.

Further, the drawing unit 1603 is configured to draw the soft keyboard at a fixed location in the second GUI. The determining unit 1602 is configured to determine the area in the second GUI other than the soft keyboard as a drawing area in which an application window is allowed to be drawn. The drawing unit 1603 is further configured to draw the first application window in the drawing area.

Further, the drawing unit 1603 is specifically configured to query a window state of the first application window in the first GUI, determine window parameters of the first application window in the second GUI based on the window states, where the window parameters include a size and a location that are of the first application window, and draw the first application window in the drawing area by using the window parameters.

Further, the window state of the first application window in the first GUI is a maximized state. The determining unit 1602 is further configured to determine a location and a size that are of a largest rectangle in the drawing area as the window parameters of the first application window in the second GUI.

Further, the window state of the first application window in the first GUI is a restored state. The determining unit 1602 is further configured to determine whether the first application window in the first GUI is able to be disposed in the drawing area, and if the first application window is able to be disposed in the drawing area, use a first size of the first application window in the first GUI as the size of the first application window in the second GUI, and use, by the terminal, a location with the first size in the drawing area as the location of the first application window in the second GUI, or if the first application window is not able to be disposed in the drawing area, reduce the first application window from the first size to a second size, and use, by the terminal, a location with the second size in the drawing area as the location of the first application window in the second GUI.

Further, the soft keyboard is fixedly displayed at the bottom of the second GUI, and a height D2 of the first application window in the first GUI is less than or equal to a height D1 of the drawing area. The determining unit 1602 is specifically configured to determine a location obtained after the first application window in the first GUI is translated by a first distance along a first direction as the location of the first application window in the second GUI, where the first direction is a direction in which the first application window is away from the soft keyboard, and the first distance is a distance at which the first application window in the first GUI overlaps the soft keyboard in the first direction.

Further, the soft keyboard is fixedly displayed at the bottom of the second GUI, and a height D2 of the first application window in the first GUI is greater than a height D1 of the drawing area. The determining unit 1602 is specifically configured to use the height D1 of the drawing area as a height of the first application window in the second GUI, and use a width of the first application window in the first GUI as a width of the first application window in the second GUI, to obtain the size of the first application window in the second GUI, and determine a location obtained after the first application window in the first GUI is translated by a second distance along a first direction as the location of the first application window in the second GUI, where the first direction is a direction in which the first application window is away from the soft keyboard, and the second distance is a distance between the first application window in the first GUI and the top of the first GUI.

All related content of the steps in the foregoing method embodiment may be cited in function descriptions of the corresponding function modules. Details are not described herein again.

Figure 18:
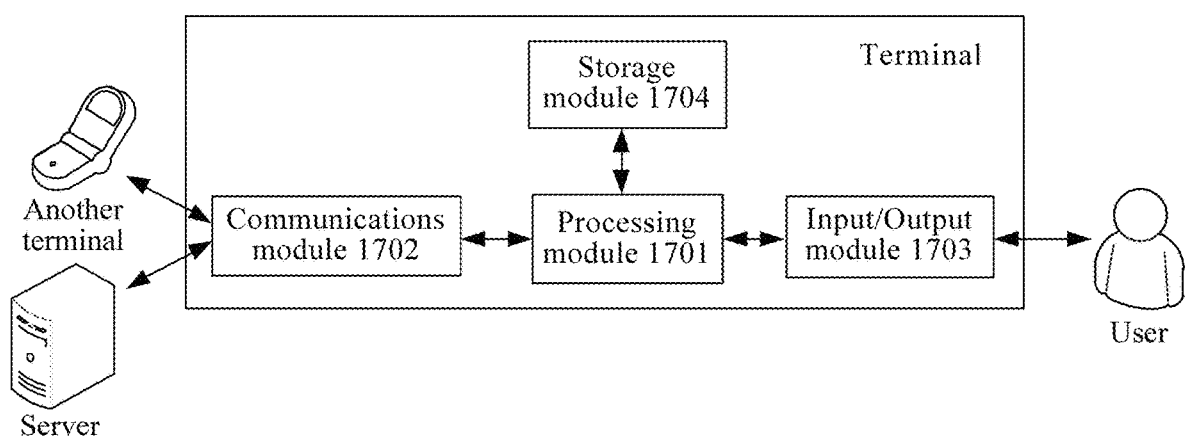
FIG. 18 is a schematic structural diagram 3 of a terminal according to an embodiment of this application.

When an integrated unit is used, the determining unit 1602 and the drawing unit 1603 may be integrated into a processing module, the display unit 1601 is used as an output module, and the display unit 1601 is used as an input module. Certainly, the terminal may further include a storage module and a communications module. In this case, FIG. 18 is a possible schematic structural diagram of the terminal in the foregoing embodiments. The terminal includes a processing module 1701, a communications module 1702, an input/output module 1703, and a storage module 1704.

The processing module 1701 is configured to control and manage an action of the terminal. The communications module 1702 is configured to support the terminal in communicating with another network entity. The input/output module 1703 is configured to receive information entered by a user, or output information provided for a user and various menus of the terminal. The storage module 1704 is configured to store program code and data that are of the terminal.

For example, the processing module 1701 may be a processor or a controller, for example, may be a central processing unit (CPU), a GPU, a general-purpose processor, a digital signal processor (DSP), an application-specific integrated circuit (ASIC), a field programmable gate array (FPGA), or another programmable logic device, a transistor logical device, a hardware component, or any combination thereof. The processing module 1701 may implement or execute various example logical blocks, modules, and circuits described with reference to content disclosed in this application. The processor may be a combination of processors implementing a computing function, for example, a combination of one or more microprocessors, or a combination of a DSP and a microprocessor.

The communications module 1702 may be a transceiver, a transceiver circuit, an input/output device, a communications interface, or the like. For example, the communications module 1702 may be specifically a Bluetooth apparatus, a Wi-Fi apparatus, or a peripheral interface.

The storage module 1704 may be a memory. The memory may include a high-speed random access memory (RAM), or may include a nonvolatile memory, for example, a magnetic disk storage device, a flash memory device, or another volatile solid-state storage device.

The input/output module 1703 may be an input/output device such as a touchscreen, a keyboard, a microphone, and a display. The display may be specifically configured in a form such as a liquid crystal display or an organic light emitting diode. In addition, a touchpad may be further integrated into the display, and is configured to collect a touch event on or near the touchpad, and send collected touch information to another device (for example, a processor).

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk solid state disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A method, comprising:
displaying, by a terminal, a first graphical user interface (GUI), wherein the first GUI comprises a first application window and a second application window, and the first GUI comprises a first icon of a first application and a second icon of a second application;
receiving, by the terminal, an input operation performed on the first application window, wherein the input operation instructs to display a soft keyboard, a display location of the soft keyboard to be displayed partially or completely overlaps a first display location of the first application window in the first GUI and a second display location of the second application window in the first GUI; and
displaying, by the terminal, a second GUI in response to the input operation, wherein the second GUI includes a first area and a second area, and wherein the second GUI comprises the soft keyboard at a fixed display location in the second area, and wherein the first area in the second GUI other than the second area in which the soft keyboard is displayed comprises the first application window and the second application window,
wherein the first application window and the second application window are completely displayed in the second GUI such that the first application window, the second application window, and the soft keyboard do not overlap one another in the second GUI,
wherein a second aspect ratio of the first application window in the second GUI is the same as a first aspect ratio of the first application window in the first GUI, and a second orientation of the first application window in the second GUI is the same as a first orientation of the first application window in the first GUI,
wherein a third display location of the first application window in the second GUI is different from the first display location of the first application window in the first GUI, and
wherein a fourth display location of the second application window in the second GUI is different from the second display location of the second application window in the first GUI.

2. The method according to claim 1, wherein the soft keyboard is fixedly displayed at a bottom of the second GUI.

3. The method according to claim 2,
wherein the third display location of the first application window in the second GUI is higher than the first display location of the first application window in the first GUI, and
wherein the fourth display location of the second application window in the second GUI is higher than the second display location of the second application window in the first GUI.

4. The method according to claim 2,
wherein the third display location of the first application window in the second GUI is closer to a top of the terminal than the first display location of the first application window in the first GUI, and
wherein the fourth display location of the second application window in the second GUI is closer to the top of the terminal than the second display location of the second application window in the first GUI.

5. The method according to claim 1, wherein the input operation is performed in an input box in the first application window.

6. The method according to claim 1,
wherein a second size of the first application window in the second GUI is the same as a first size of the first application window in the first GUI, or
wherein the second size of the first application window in the second GUI is smaller than the first size of the first application window in the first GUI.

7. The method according to claim 1, wherein the first application window and the second application window are floating windows.

8. The method according to claim 1,
wherein the first application window partially or completely overlaps the second application window in the first GUI, and
wherein the first application window does not overlap the second application window in the second GUI.

9. A terminal, comprising:
at least one processor; and
a non-transitory computer readable storage medium storing instructions that, when executed by the at least one processor, cause the terminal to perform operations including:
displaying a first graphical user interface (GUI), wherein the first GUI comprises a first application window and a second application window, and the first GUI comprises a first icon of a first application and a second icon of a second application;
receiving an input operation performed on the first application window, wherein the input operation instructs to display a soft keyboard, a display location of the soft keyboard to be displayed partially or completely overlaps a first display location of the first application window in the first GUI and a second display location of the second application window in the first GUI; and
displaying a second GUI in response to the input operation, wherein the second GUI includes a first area and a second area, and wherein the second GUI comprises the soft keyboard at a fixed display location in the second area, and wherein the first area in the second GUI other than the second area in which the soft keyboard is displayed comprises the first application window and the second application window,
wherein the first application window and the second application window are completely displayed in the second GUI such that the first application window, the second application window, and the soft keyboard do not overlap one another in the second GUI,
wherein a second aspect ratio of the first application window in the second GUI is the same as a first aspect ratio of the first application window in the first GUI, and a second orientation of the first application window in the second GUI is the same as a first orientation of the first application window in the first GUI,
wherein a third display location of the first application window in the second GUI is different from the first display location of the first application window in the first GUI, and
wherein a fourth display location of the second application window in the second GUI is different from the second display location of the second application window in the first GUI.

10. The terminal according to claim 9, wherein the soft keyboard is fixedly displayed at a bottom of the second GUI.

11. The terminal according to claim 10,
wherein the third display location of the first application window in the second GUI is higher than the first display location of the first application window in the first GUI, and
wherein the fourth display location of the second application window in the second GUI is higher than the second display location of the second application window in the first GUI.

12. The terminal according to claim 10,
wherein the third display location of the first application window in the second GUI is closer to a top of the terminal than the first display location of the first application window in the first GUI, and
wherein the fourth display location of the second application window in the second GUI is closer to the top of the terminal than the second display location of the second application window in the first GUI.

13. The terminal according to claim 9, wherein the input operation is performed in an input box in the first application window.

14. The terminal according to claim 9,
wherein a second size of the first application window in the second GUI is the same as a first size of the first application window in the first GUI, or
wherein the second size of the first application window in the second GUI is smaller than the first size of the first application window in the first GUI.

15. The terminal according to claim 9, wherein the first application window and the second application window are floating windows.

16. The terminal according to claim 9,
wherein the first application window partially or completely overlaps the second application window in the first GUI, and
wherein the first application window does not overlap the second application window in the second GUI.

17. A non-transitory computer-readable medium having instructions stored thereon that, when executed by a terminal, cause the terminal to perform operations, the operations comprising:
displaying a first graphical user interface (GUI), wherein the first GUI comprises a first application window and a second application window, and the first GUI comprises a first icon of a first application and a second icon of a second application;
receiving an input operation performed on the first application window, wherein the input operation instructs to display a soft keyboard, a display location of the soft keyboard to be displayed partially or completely overlaps a first display location of the first application window in the first GUI and a second display location of the second application window in the first GUI; and
displaying a second GUI in response to the input operation, wherein the second GUI includes a first area and a second area, and wherein the second GUI comprises the soft keyboard at a fixed display location in the second area, and wherein the first area in the second GUI other than the second area in which the soft keyboard is displayed comprises the first application window and the second application window,
wherein the first application window and the second application window are completely displayed in the second GUI such that the first application window, the second application window, and the soft keyboard do not overlap one another in the second GUI, wherein a second aspect ratio of the first application window in the second GUI is the same as a first aspect ratio of the first application window in the first GUI, and a second orientation of the first application window in the second GUI is the same as a first orientation of the first application window in the first GUI, wherein a third display location of the first application window in the second GUI is different from the first display location of the first application window in the first GUI, and wherein a fourth display location of the second application window in the second GUI is different from the second display location of the second application window in the first GUI.

18. The non-transitory computer-readable medium according to claim 17, wherein the soft keyboard is fixedly displayed at a bottom of the second GUI.

19. The non-transitory computer-readable medium according to claim 18, wherein the third display location of the first application window in the second GUI is higher than the first display location of the first application window in the first GUI, and wherein the fourth display location of the second application window in the second GUI is higher than the second display location of the second application window in the first GUI.

20. The non-transitory computer-readable medium according to claim 18, wherein the third display location of the first application window in the second GUI is closer to a top of the terminal than the first display location of the first application window in the first GUI, and wherein the fourth display location of the second application window in the second GUI is closer to the top of the terminal than the second display location of the second application window in the first GUI.

21. The non-transitory computer-readable medium according to claim 17, wherein the input operation is performed in an input box in the first application window.

* * * * *